United States Patent
Hoshiya et al.

(10) Patent No.: US 6,409,623 B1
(45) Date of Patent: Jun. 25, 2002

(54) APPARATUS CAPABLE OF DRIVING VEHICLE IN REVERSE DIRECTION WITH ENGINE AS WELL AS ELECTRIC MOTOR

(75) Inventors: Kazumi Hoshiya, Gotenba; Hidehiro Oba, Aichi-gun, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/680,707

(22) Filed: Oct. 6, 2000

(30) Foreign Application Priority Data

Oct. 8, 1999 (JP) .......................................... 11-287933

(51) Int. Cl.[7] .............................................. F16H 3/72
(52) U.S. Cl. ........................................................ 475/5
(58) Field of Search ........................................ 475/317

(56) References Cited

U.S. PATENT DOCUMENTS 6,217,479 B1 * 4/2001 Brown et al. .................. 477/86
6,258,001 B1 * 7/2001 Wakuta et al. ................. 475/5
6,306,057 B1 * 10/2001 Morisawa et al. ............. 475/5

FOREIGN PATENT DOCUMENTS

JP  937411 A  2/1997

* cited by examiner

Primary Examiner—Dirk Wright
(74) Attorney, Agent, or Firm—Kenyon & Kenyon

(57) ABSTRACT

An apparatus for rear-driving an automotive vehicle having a drive power source, an output member operatively connected to a drive wheel, a gear type synthesizing/distributing device including a housing, and a first, a second and a third rotary element, the first and second rotary elements being rotated in respective opposite directions when the third rotary element is stationary, and connected to the drive power source and the output member, respectively, and a brake or fixing the third rotary element to the housing, wherein the brake is a frictional coupling device capable of effecting a slipping engagement. The apparatus includes a reverse friction-drive control device which is operable when the first rotary element is rotated in a forward direction with an operation of the drive power source, while the third rotary element is rotated in the forward direction with a rotary motion of the first rotary element, the reverse friction-drive control device controlling the brake to effect the slipping engagement so as to restrict a rotary motion of the third rotary element, for thereby causing a drive torque to act on the second rotary element in a reverse direction to drive the vehicle in the reverse direction.

6 Claims, 17 Drawing Sheets

FIG. 4

| SHIFT LEVER POSITION | MODE | ENGAGED(◯) OR RELEASED(✕) | | |
|---|---|---|---|---|
| | | C1 | C2 | B1 |
| B,D | ETC MODE | ✕ | ◯ | ✕ |
| | DIRECT MODE | ◯ | ◯ | ✕ |
| | MOTOR DRIVE MODE | ◯ | ✕ | ✕ |
| N,P | NEUTRAL MODE 1,2 | ✕ | ✕ | ✕ |
| | CHARGING & ENGINE START MODE | ✕ | ✕ | ◯ |
| R | MOTOR DRIVE MODE | ◯ | ✕ | ✕ |
| | FRICTION DRIVE MODE | ◯ | ✕ | ◯ |

APPARATUS CAPABLE OF DRIVING VEHICLE IN REVERSE DIRECTION WITH ENGINE AS WELL AS ELECTRIC MOTOR

This application is based on Japanese Patent Application No. 11-287933 filed October 8, the contents of which are incorporated hereinto by reference.

BACKGROUND OF THE INVENTION

1. Field of the Invention

The present invention relates to a rear driving apparatus for driving an automotive vehicle in the reverse direction, and more particularly to technologies associated with a synthesizing/distributing device of gear type used in the rear driving apparatus.

2. Discussion of Related Art

There is known a hybrid automotive vehicle equipped with a drive system including (a) an engine operated by combustion of a fuel to produce a drive force, (b) an electric motor, (c) an output member operatively connected to drive wheels, (d) a planetary gear device associated with the engine, electric motor and output member, for synthesizing and distributing a drive force or forces, and (e) a plurality of frictional coupling devices such as clutches and brakes for selectively connecting and disconnecting rotary elements of the planetary gear device and the output member to and from each other or a stationary member. An example of such a hybrid vehicle drive system is disclosed in JP-A-9-37411, wherein various drive modes are selectively established for driving the vehicle, by controlling the operating states of the clutches and brakes. For instance, the drive modes include a motor-drive mode in which the vehicle is driven by the electric motor as a drive power source, and an engine-drive mode in which the vehicle is driven by the engine as the vehicle drive source.

In a hybrid vehicle as described above, only the electric motor is generally used as the drive power source to drive the vehicle in the reverse direction. However, the drive force produced by the electric motor may be insufficient when the vehicle is driven in the reverse direction on an uphill. In particular, the drive torque produced by the electric motor is limited when the amount of electric energy stored in an electric energy storing device is reduced below a certain lower limit.

The assignee of the present application disclosed in JP-A-2000-92612 (published on Mar. 31, 2000 after the present invention was made) a hybrid vehicle equipped with a drive system including (a) an engine, (b) an electric motor, (c) an output member operatively connected to drive wheels, (d) a double-pinion type planetary gear device having a sun gear connected to the engine, a carrier connected to the electric motor, and a ring gear, (e) a brake for fixing the ring gear to a stationary housing, (f) a first clutch for connecting the carrier to the output member, (g) a second clutch for connecting the ring gear to the output member, and (h) a control device adapted to engage the first clutch and operate the electric motor in the reverse direction, for rotating the drive wheel through the output member for driving the vehicle in the reverse direction, the control device being further adapted to engage the brake and operate the engine as needed, so as to provide an assisting drive torque for driving the vehicle in the reverse direction. The drive system of this hybrid vehicle is capable of providing a sufficiently large drive force for driving the vehicle in the reverse direction. However, the drive system suffers from a relatively large variation in the rear drive force upon an engaging action of the brake, resulting in a risk of a stall of the engine when the running speed of the vehicle is relatively low. Thus, the drive system disclosed in JP-A-2000-92612 is not practically available.

SUMMARY OF THE INVENTION

It is therefore an object of the present invention to provide a rear driving apparatus for driving an automotive vehicle in the reverse direction, which apparatus permits the engine to be operated to provide an assisting rear drive torque through a synthesizing/distributing device of a gear type even at a relatively low running speed of the vehicle, while minimizing a variable in the rear drive force.

The above object may be achieved according to a first aspect of the present invention, which provides a vehicle rear driving apparatus for driving an automotive vehicle in a reverse direction, the automotive vehicle having a drive power source, an output member operatively connected to a drive wheel of the vehicle for driving the vehicle, a synthesizing/distributing device of gear type including a housing, a first rotary element, a second rotary element and a third rotary element, the first and second rotary elements being rotated in respective opposite directions when the third rotary element is stationary, and connected to the drive power source and the output member, respectively, and a brake for fixing the third rotary element to the housing, the vehicle rear driving apparatus being characterized in that the brake is a frictional coupling device capable of effecting a slipping engagement, and that reverse friction-drive control means is provided, the reverse friction-drive control means being operable when the first rotary element is rotated in a forward direction with an operation of the drive power source, while the third rotary element is rotated in the forward direction with a rotary motion of the first rotary element, the reverse friction-drive control means controlling the brake to effect the slipping engagement so as to restrict a rotary motion of the third rotary element, for thereby causing a drive torque to act on the second rotary element in a reverse direction to drive the vehicle in the reverse direction.

In the vehicle rear driving apparatus constructed according to a first aspect of this invention, the reverse friction-drive control means is operated when the first rotary element is rotated in the forward direction with an operation of the drive power source while the third rotary element is rotated in the forward direction with a rotary motion of the first rotary element. The reverse friction-drive control means is adapted to effect the slipping engagement so as to restrict a rotary motion of the third rotary element, for thereby causing a drive torque to act on the second rotary element in a reverse direction to drive the vehicle in the reverse direction. Thus, the vehicle can be driven with a sufficiently large drive force by utilizing an engine, for example. Further, the slipping engagement of the brake makes it possible to reduce a variation in the vehicle drive force, and permits the vehicle to be driven in the reverse direction even at a relatively low speed while maintaining a relatively high operating speed of the drive power source such as an engine.

The synthesizing/distributing device of gear type may be a planetary gear device of single- or double-pinion type, or differential gear device of bevel gear type. The frictionally coupling brake capable of effecting a slipping engagement is preferably a hydraulically operated friction brake of multiple-disc type. However, the brake may be an electromagnetically operated brake. A clutch or clutches, or other brake or brakes may be disposed between the second rotary element and the output member.

The drive power source preferably includes an engine which is operated by combustion of a fuel, and may include any other type of power source such as an electric motor. The vehicle rear driving apparatus according to the first aspect of the invention need not comprise reverse-motor-drive control means for driving the vehicle in the reverse direction with only an electric motor while the brake is held in the released state, as described below with respect to a second aspect of the invention.

The vehicle rear driving apparatus according to the first aspect of the invention described above is advantageously applicable to a hybrid vehicle wherein the drive power source includes an engine operable by combustion of a fuel, and an electric motor, and the synthesizing/distributing device comprises a planetary gear device including a sun gear as the first rotary element, a carrier as the second rotary element, and a ring gear as the third rotary element, the engine being connected to the sun gear while the electric motor being connected to the carrier. In this form of the invention, the brake is operable to fix the ring gear to the housing, and the apparatus includes a first clutch for connecting the carrier to the output member, and a second clutch for connecting the ring gear to the output member.

The object indicated above may also be achieved according to a second aspect of this invention, which provides a vehicle rear driving apparatus for driving a hybrid automotive vehicle in a reverse direction, the automotive vehicle having a drive power source consisting of an engine operable by combustion of a fuel and an electric motor, an output member operatively connected to a drive wheel of the vehicle for driving the vehicle, a synthesizing/distributing device of gear type including a housing, a first rotary element, a second rotary element and a third rotary element, the first and second rotary elements being rotated in respective opposite directions when the third rotary element is stationary, and connected to the engine and the electric motor, respectively, and a brake for fixing the third rotary element to the housing, the vehicle rear driving apparatus being characterized in that the brake is a frictional coupling device capable of effecting a slipping engagement, that reverse-motor-drive control means is provided for operating the electric motor in a reverse direction to rotate the second rotary element while the brake is held in its released state, for thereby driving the vehicle in the reverse direction, and that engine-assisted reverse-motor-drive control means is provided, the engine-assisted reverse-motor-drive control means being operable when the vehicle is driven in the reverse direction under the control of the reverse-motor-drive control means, the engine-assisted reverse-motor-drive control means operating the engine to rotate the first rotary element in a forward direction, and controlling the brake to effect the slipping engagement while the third rotary element is rotated in a forward direction with a rotary motion of the first rotary element in the forward direction, so that a rotary motion of the third rotary element is restricted to cause a drive torque to act on the second rotary element in a reverse direction to drive the vehicle in the reverse direction.

In the vehicle rear driving apparatus constructed according to the second aspect of the present invention, the vehicle can be driven in the reverse direction with the electric motor operated in the reverse direction with the brake under the control the reverse-motor-drive control means reverse-motor-drive control means. During this reverse running of the vehicle with the electric motor, an assisting rear drive torque can be produced by the engine under the control of the engine-assisted reverse-motor-drive control means, such that the engine is operated to rotate the first rotary element in the forward direction, while at the same time the brake is controlled to effect a slipping engagement with the third rotary element being rotated in the forward direction with a rotary motion of the first rotary element in the forward direction, so that a rotary motion of the third rotary element is restricted to cause the assisting rear drive torque to act on the second rotary element in the reverse direction to drive the vehicle in the reverse direction. Thus, the vehicle can be driven in the reverse direction by the engine as well as the electric motor, with a sufficiently large total drive force. Further, the slipping engagement of the brake makes it possible to reduce a variation in the vehicle drive force upon switching of the drive mode from the reverse motor drive mode to the engine-assisted reverse motor drive mode, and permits the vehicle to be driven in the reverse direction even at a relatively low speed while maintaining a relatively high operating speed of the drive power source such as an engine. The vehicle rear driving apparatus according to the second aspect of the invention is considered to be one form of the apparatus according to the first aspect of the invention, and the engine-assisted reverse-motor-drive control means of the apparatus according to the second aspect is considered to be one form of the reverse friction-drive control means of the apparatus according to the first aspect.

The electric motor used in the apparatus according to the second aspect of the invention is preferably a motor/generator which functions not only as an electric motor but also as an electric generator.

As described above, the engine-assisted reverse-motor-drive control means is adapted to assist the electric motor during running of the vehicle in the reverse direction under the control of the reverse-motor-drive control means. During this engine-assisted reverse motor drive mode, the electric motor need not be operated to provide its maximum torque, provided the total vehicle drive torque desired by the vehicle operator is by the electric motor and the engine. The proportion of the drive torques produced by the electric motor and the engine may be suitably determined as needed, on the basis of selected vehicle operating parameters such as the amount of electric energy stored in a battery or other electric energy storing device used for the electric motor.

The engine-assisted reverse-motor-drive control means is arranged to control the slip speed or engaging torque of the brake to permit the engine to provide an assisting rear drive force during reverse running of the vehicle by the electric motor. After the vehicle running speed has been raised to a level at which the engine will not stall even with the brake being fully engaged, however, the brake may be brought to its fully engaged state. It is also possible to drive the vehicle in the reverse direction with only the drive torque produced by the engine, by placing the electric motor in a free or non-load state without an output drive force and holding the brake in a slipping state or the fully engaged state. The reverse friction-drive control means provided according to the first aspect of the invention may also be arranged to fully engage the brake when a predetermined condition is satisfied.

The vehicle rear driving apparatus according to the second aspect of the invention described above is advantageously applicable to a hybrid vehicle wherein the synthesizing/distributing device comprises a planetary gear device including a sun gear as the first rotary element, a carrier as the second rotary element, and a ring gear as the third rotary element, the engine being connected to the sun gear while the electric motor being connected to the carrier. In this form of the invention, the brake is operable to fix the ring gear to the housing, and the apparatus includes a first clutch for connecting the carrier to the output member, and a second clutch for connecting the ring gear to the output member.

According to a first preferred form of the second aspect of the invention described above, the vehicle rear driving apparatus further comprises mode determining means for selecting an operating mode of the vehicle such that an engine-assisted reverse motor drive mode in which the vehicle is driven in the reverse direction by the electric motor and the engine under the control of the engine-assisted reverse-motor-drive control means is selected more frequently when an amount of electric energy stored in an electric energy storing device to operate the electric motor is relatively small than when the amount of electric energy stored in the electric energy storing device is relatively large.

In the first preferred form of the apparatus according to the second aspect of this invention wherein the engine-assisted reverse motor drive mode is established more frequently when the electric energy amount stored in the electric energy storing device is relatively small than when the stored electric energy amount is relatively large. This arrangement results in a reduced frequency of operation of the electric motor and a reduced amount of electric energy consumption by the electric motor, since the engine is more frequently operated to assist the electric motor when the stored electric energy amount is relatively small. Thus, the electric energy can be more effectively utilized. In other words, the mode determining means relatively frequently selects the engine-assisted reverse motor drive mode (relatively frequently activates the engine-assisted reverse-motor-drive control means) when the stored electric energy amount is relatively large, and relatively infrequently selects a reverse-motor-drive mode in which the vehicle is driven in the reverse direction by only the electric motor (relatively infrequently activates the reverse-motor-drive control means) when the stored electric energy amount is relatively large. Accordingly, a relatively large amount of electric energy is consumed by the electric motor under the control of the reverse-motor-drive control means when the stored electric energy amount is relatively large. When the stored electric energy amount is relatively large, on the other hand, the engine is relatively frequently operated to assist the electric motor, and the operation of the electric motor is restricted, so that a relatively small amount of electric energy is consumed by the electric motor under the control of the engine-assisted reverse-motor-drive control means when the stored electric energy amount is relatively small. Thus, the required vehicle drive torque can be obtained while minimizing the amount of consumption of the electric energy, so that the electric energy amount stored in the electric energy storing device can be maintained in a range in which the energy consumption efficiency is relatively high.

For instance, the mode determining means is adapted to select the engine-assisted reverse motor drive mode or activates the engine-assisted reverse-motor-drive control means, when the operator's desired vehicle drive torque is larger than the permissible maximum output torque of the electric motor. In this instance, the permissible maximum output torque may be determined such that the permissible maximum output torque decreases with a decrease in the amount of electric energy stored in the electric energy storing device. This arrangement results in a relatively high frequency of operation of the engine as well as the electric motor when the stored electric energy amount is relatively small.

According to a second preferred form of the apparatus according to the above second aspect of the present invention, the engine-assisted reverse-motor-drive control means includes means for controlling an engaging torque of the brake according to a difference between a desired vehicle drive torque desired by an operator of the vehicle and an output torque of the electric motor, and controls an output torque of the engine in a feedback fashion such that an operating speed of the engine coincides with a desired value.

In the second preferred form of the apparatus according to the second aspect of the invention, the engaging torque of the brake is controlled depending upon an amount of shortage of the actual total vehicle drive force, which is a difference of the operator's desired drive force from the output torque of the electric motor. Further, the output torque of the engine is feedback-controlled such that the speed of the engine coincides with the desired value. Thus, the operator's desired drive torque can be produced by both of the engine and the motor/generator, with the engine speed being controlled to the desired value with high accuracy.

The engine-assisted reverse-motor-drive control means provided according to the above-described second preferred form of the apparatus may be adapted to control the engaging torque of the brake while taking into account the gear ratio of the synthesizing/distributing device such that the drive torque corresponding to the difference between the operator's desired vehicle drive torque and the output torque of the electric motor acts on the second rotary element through the slipping engagement of the brake. At the same time, the engine-assisted reverse-motor-drive control means controls the output torque of the engine so that the engine speed is made equal to the desired value. For the feedback control of the engine torque, it is desirable to control as a feed-forward item a portion of the engaging torque of the brake which corresponds to the engine, namely, the drive torque corresponding to the gear ratio of the synthesizing/distributing device.

Although the output torque of the engine is feedback-controlled according to the second preferred form, the engine-assisted reverse-motor-drive control means according to the second aspect of this invention may be adapted to control the engine torque depending upon the difference between the operator's desired drive torque and the output torque of the electric motor, and at the same time feedback-control the engaging torque of the brake such that the engine speed coincides with the desired value. Namely, the engine torque is controlled while taking into account the gear ratio of the synthesizing/distributing device such that the drive torque equal to the above-indicated difference acts on the second rotary element, and at the same time the engaging torque for the brake is controlled in a feedback fashion such that the engine speed coincides with the desired value. For the feedback control of the engaging torque of the brake, it is desirable to control as a feed-forward item a portion of the engine torque which corresponds to the brake, namely, the drive torque corresponding to the gear ratio of the synthesizing/distributing device.

BRIEF DESCRIPTION OF THE INVENTION

The above and other objects, features, advantages and technical and industrial significance of the present invention will be better understood by reading the following detailed description of presently preferred embodiments of the invention, when considered in connection with the accompanying drawings, in which:

FIG. 4 is a view showing various vehicle operating modes selectively established by a hybrid control device shown in FIG. 1, and a relationship between the operating modes and respective combinations of operating states of two clutches and a brake;

Figure 8:
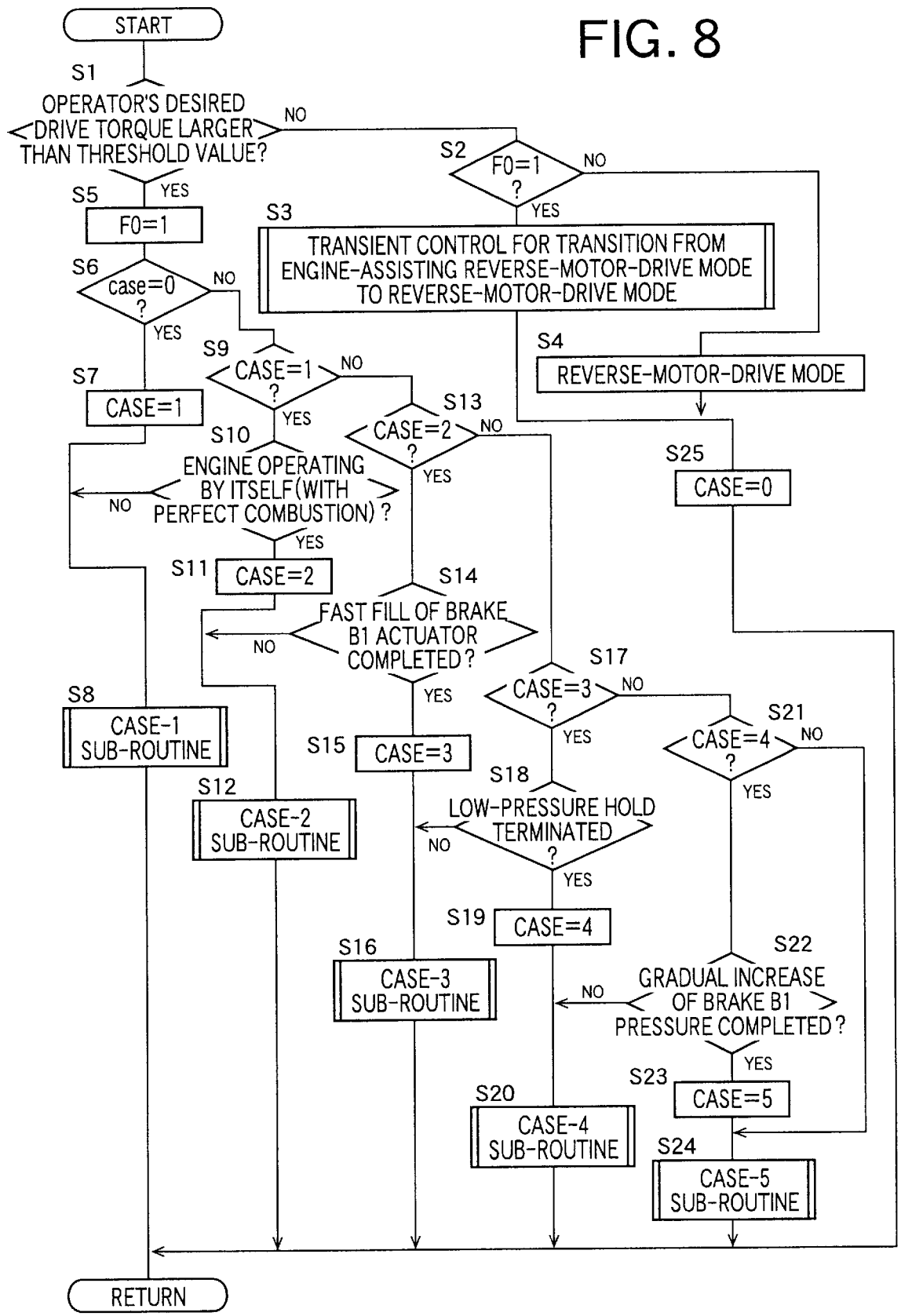
FIG. 8 is a flow chart illustrating a control routine for controlling the hybrid drive system when the vehicle is driven in the REVERSE MOTOR DRIVE mode and the FRICTION DRIVE mode, which are selectively established depending upon a desired drive torque.
Figure 16:
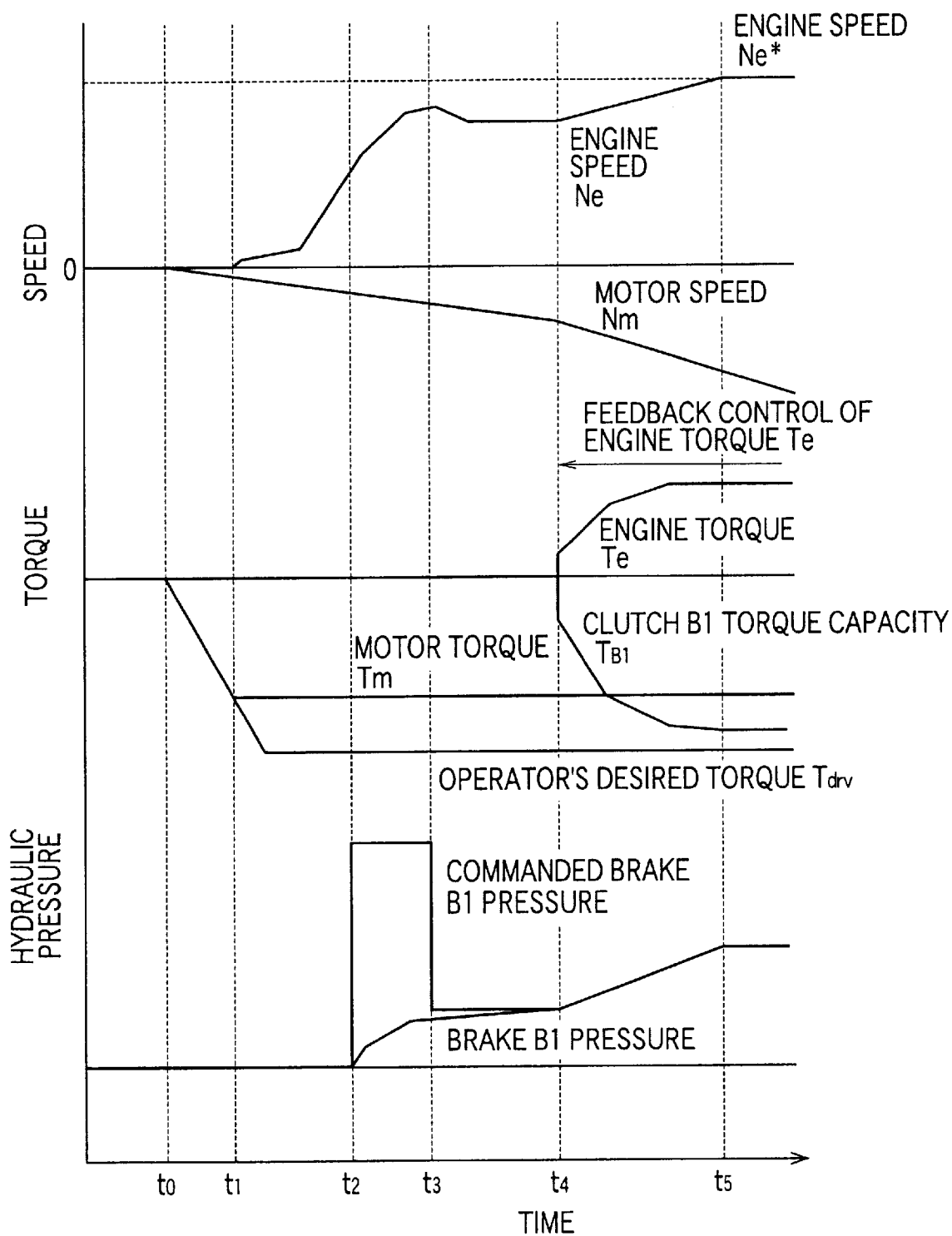
Figure 17:
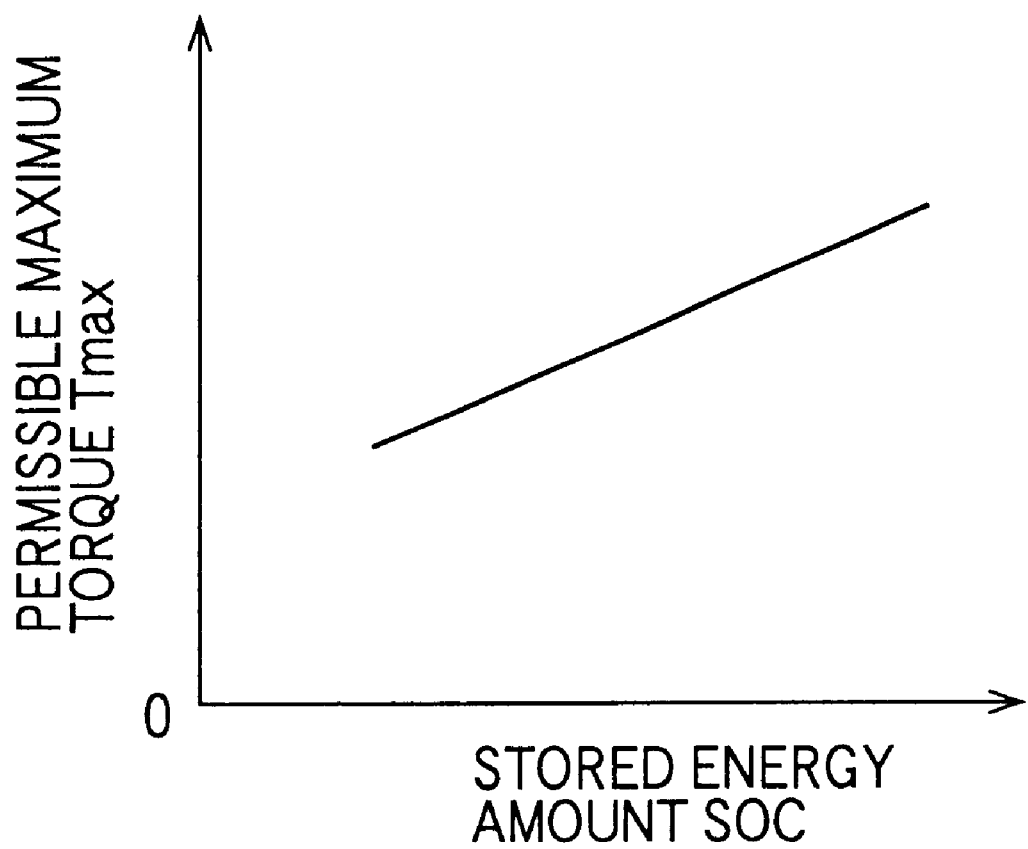

FIG. 16 is a time chart indicating changes of various parameters during a transient control effected when the vehicle operating mode is changed from the REVERSE MOTOR DRIVE MODE to the FRICTION DRIVE mode according to the control routine of FIG. 8, immediately after starting of the vehicle; and FIG. 17 is a graph indicating an example of a data map used for calculating a permissible maximum torque value Tmax in step S1 of the flow chart of FIG. 8.

DETAILED DESCRIPTION OF THE PREFERRED EMBODIMENTS

Figure 1:
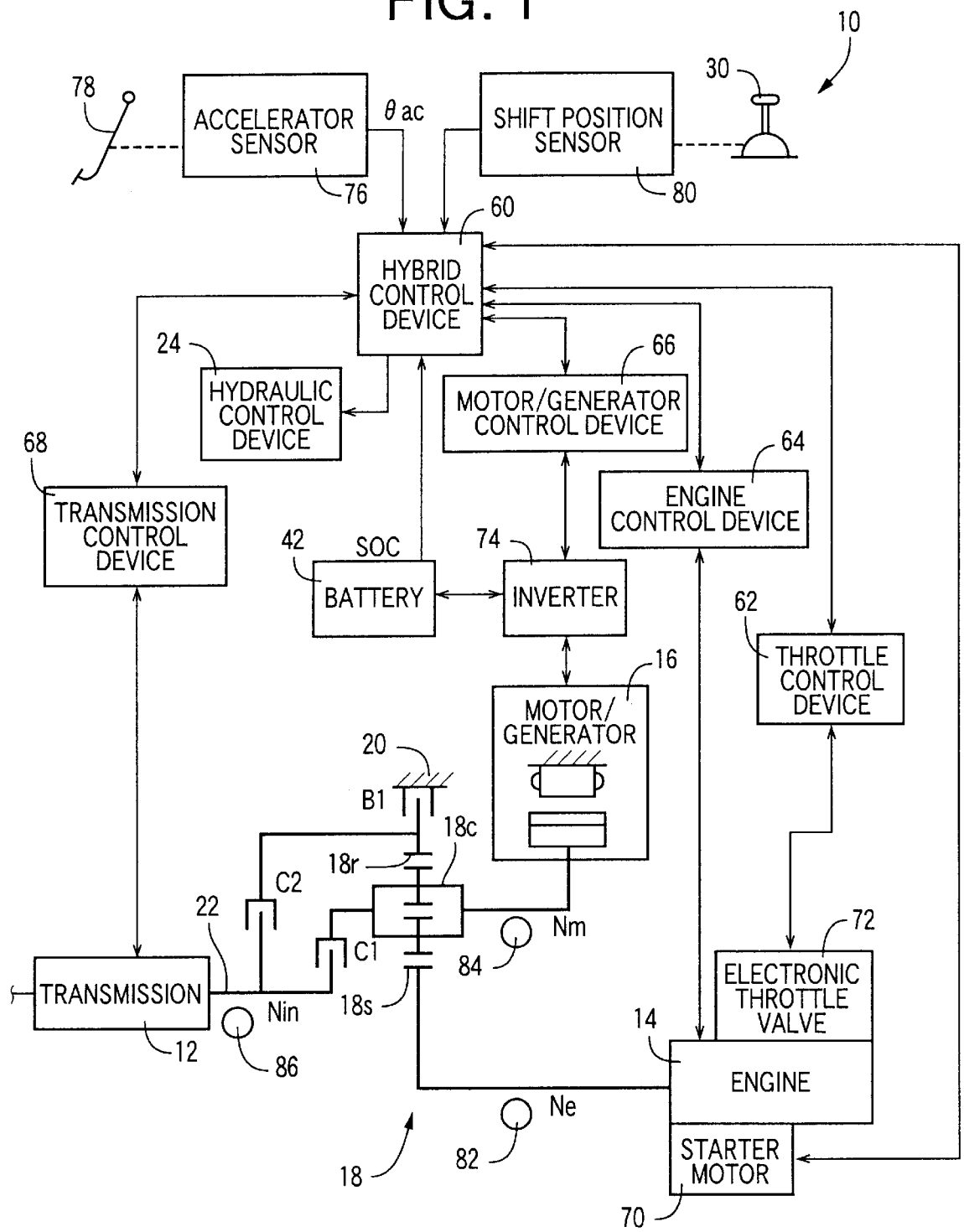
FIG. 1 is a schematic view showing an arrangement of a hybrid drive system of a hybrid automotive vehicle, which drive system includes a rear driving apparatus constructed according to one embodiment of this invention.
Figure 2:
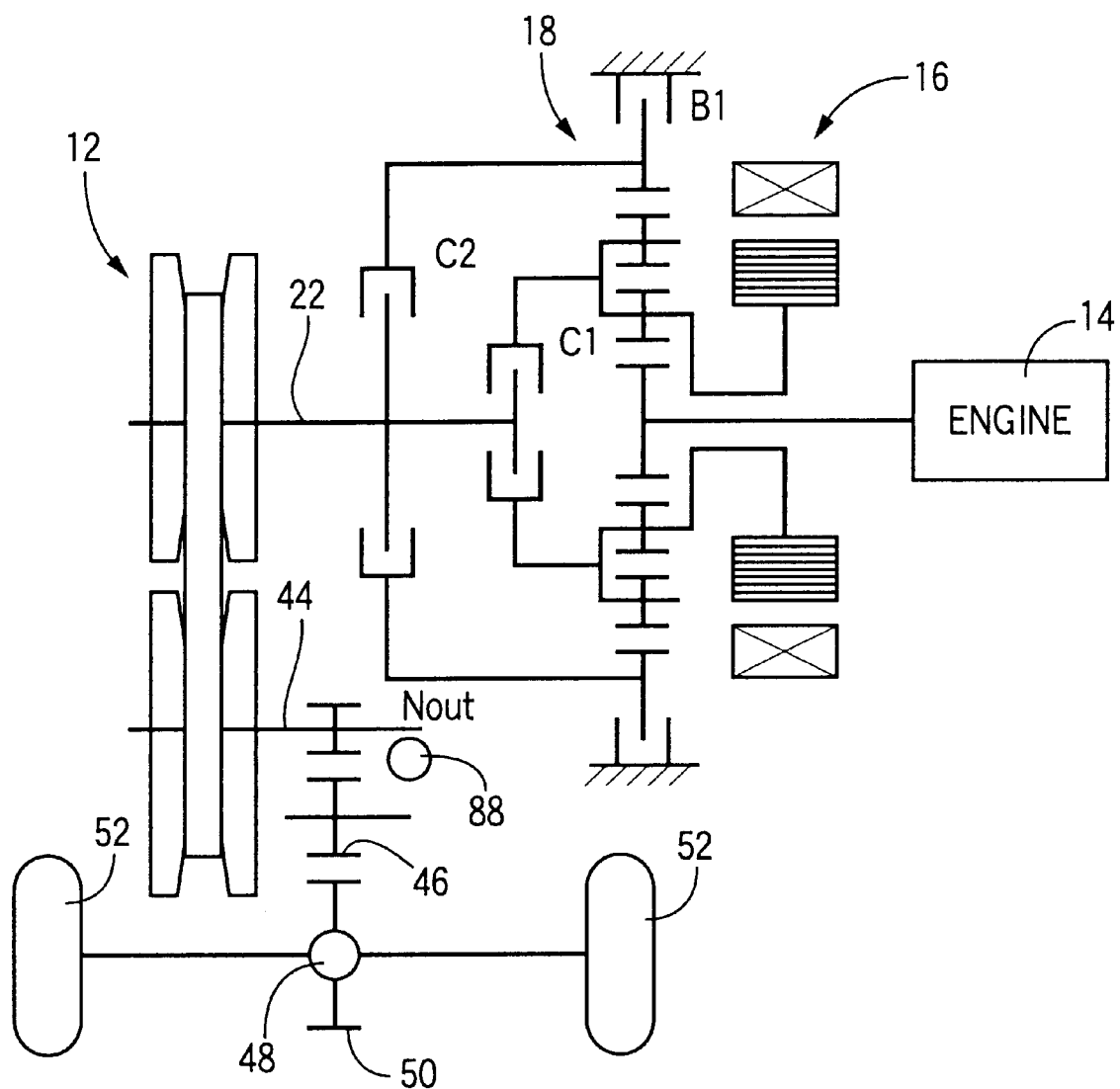
FIG. 2 is a schematic view showing a power transmitting system of the hybrid drive system of FIG. 1.

Referring first to FIGS. 1 and 2, there is schematically shown an arrangement of a hybrid drive system 10 of a hybrid automotive vehicle, which is constructed according to one embodiment of the present invention. As shown in FIG. 2, the hybrid drive system 10 includes an engine 14, a motor/generator 16, and a power transmitting system which includes a transmission 12 and a planetary gear device 18 of a double-pinion type. The engine 14 is operated by combustion of a fuel to produce a drive force, and the motor/generator 16 serves as an electric motor and an electric generator.

The planetary gear device 18 includes a sun gear 18s connected to the engine 14, a carrier 18c connected to the motor/generator 16, and a ring gear 18r connected to a housing 20 through a first brake B1. The carrier 18c is further connected through a first clutch C1 to an input shaft 22 of the transmission 12, and the ring gear 18r is further connected through a second clutch C2 to the input shaft 22. It will be understood that the planetary gear device 18 functions as a synthesizing/distributing device of a gear type, and that the sun gear 18s, carrier 18c and ring gear 18r serve as a first, a second and a third rotary element of the planetary gear device 18, respectively. It will also be understood that the input shaft 22 of the transmission 12 serves as an output member operatively connected to drive wheels 52, 52.

Figure 3:
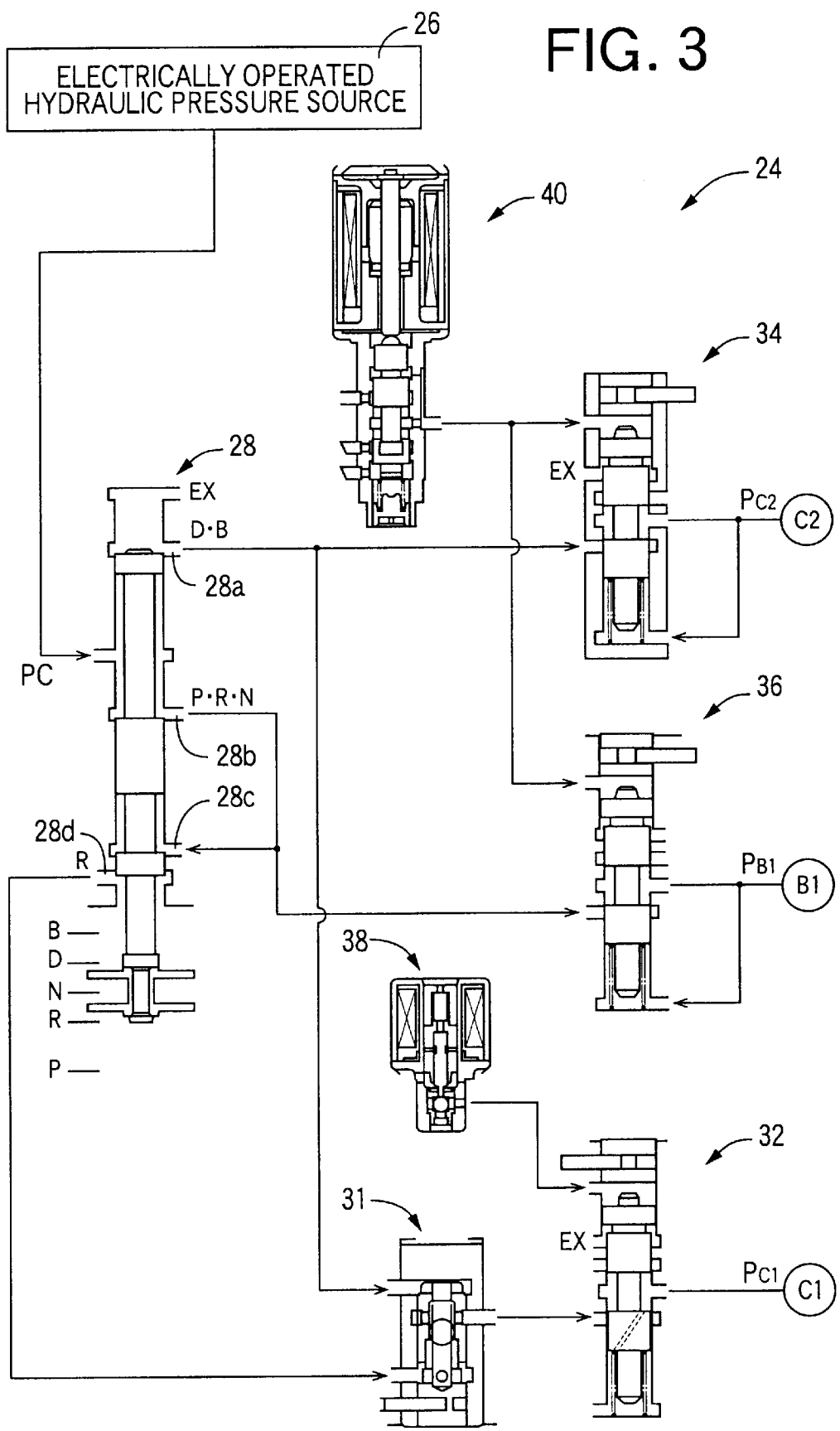
FIG. 3 is a view showing a portion of a hydraulic control device shown in FIG. 1.

Each of the first and second clutches C1, C2 and the brake B1 is a hydraulically operated frictional coupling device of a wet multiple-disc type which is frictionally engaged by a hydraulic actuator activated by a pressurized fluid supplied from a hydraulic control device 24. As shown in FIG. 3, the hydraulic control device 24 includes an electrically operated hydraulic pressure source 26 having an electrically operated pump, which generates a pressurized fluid having a line pressure PC. This line pressure PC is applied to the clutches C1, C2 and brake B1 through a manual valve 28, depending upon a presently selected position of a shift lever 30 (shown in FIG. 1). The shift lever 30, which is operated by an operator of the vehicle, has five operating positions B (BRAKE), D (DRIVE), N (NEUTRAL), R (REVERSE) and P (PARKING). The manual valve 28 is mechanically connected to the shift lever 30 through a cable or other linkage, so that the manual valve 28 is mechanically operated by the shift lever 30.

The operating position B is a power-source braking position which is usually selected to shift down the transmission 12 during a forward running of the vehicle, for applying a comparatively large power-source brake (e.g., an engine brake) to the vehicle. The operating position P is a forward-driving position selected to drive the vehicle in the forward direction. In these operating positions B and D, the line pressure PC is applied from an output port 28a of the manual valve 28 to the clutches C1, C2. The line pressure PC is applied to the first clutch C1 through a shuttle valve 31. The operating position N is a neutral position in which a power transmitting path between a drive power source in the form of the engine 14 and the motor/generator 16 and the drive wheels 52 is disconnected. The operating position R is a reverse-driving position selected to drive the vehicle in the reverse direction. The operating position P is a parking position in which the power transmitting path indicated above is disconnected and in which a parking brake is mechanically applied to the drive wheels 52 by a parking lock device. In these operating positions N, R and P, the line pressure PC is applied from an output port 28b of the manual valve 28 to the brake B1. The line pressure PC is also applied from the output port 28b to a return port 28c. In the operating position R, the line pressure PC is applied from the return port 28c to the first clutch C1 through an output port 28d and the shuttle valve 31.

The clutches C1, C2 and brake B1 are provided with respective control valves 32, 34, 36, which control fluid pressures $P_{C1}$, $P_{C2}$ and $P_{B1}$ applied to the clutches C1, C2 and brake B1, respectively. The control valve 32 for the first clutch C1 is arranged to receive a pilot pressure from an ON-OFF valve 38, to regulate the pressure $P_{C1}$, while the control valves 34, 36 for the second clutch C2 and brake B1 are arranged to receive a pilot pressure from a linear solenoid valve 40, to regulate the pressures $P_{C2}$ and $P_{B1}$.

Referring next to FIG. 4, there are indicated various operating modes of the hybrid vehicle in relation to respective different combinations of operating states of the first and second clutches C1, C2 and the brake B1. In FIG. 4, "∘" represents the engaged state of the clutches and brake C1, C2, B1, while "X" represents the released state of the same. When the shift lever 30 is placed in the operating position B or D, one of an ETC mode (electric torque converter mode), a DIRECT mode and a FORWARD MOTOR DRIVE mode is established. The ETC mode is established by engaging the second clutch C2 and releasing the first clutch C1 and the brake B1. In the ETC mode, the vehicle is driven in the forward direction by operations of both of the engine 14 and the motor/generator 16. The DIRECT mode is established by engaging the first and second clutches C1, C2 and releasing the brake B1. In the DIRECT mode, the vehicle is driven in the forward direction by an operation of the engine 14.

The FORWARD MOTOR DRIVE mode is established by engaging the first clutch C1 and releasing the second clutch C2 and the brake B1. In the FORWARD MOTOR DRIVE mode, the vehicle is driven in the forward direction by an operation of the motor/generator 16. The ETC mode (electric torque converter mode) may be referred to as an "engine & motor drive mode", while the DIRECT mode may be referred to as a "direct engine drive mode".

Figure 5A:
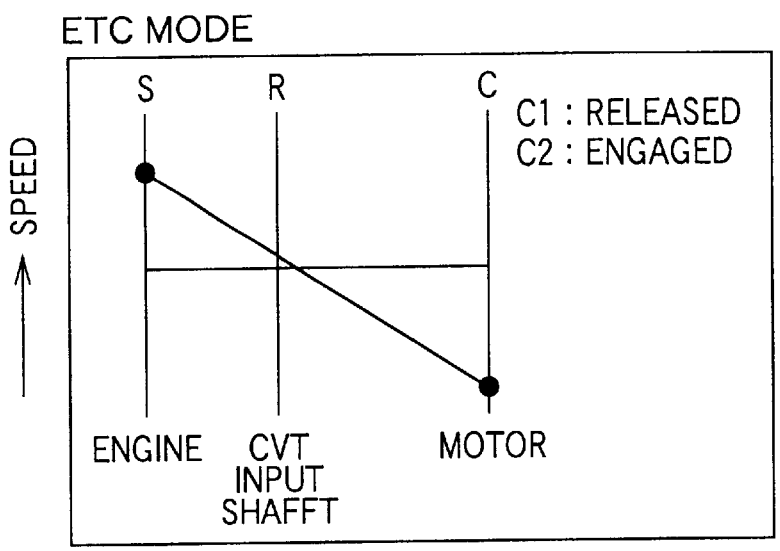
FIG. 5A is a collinear chart indicating a relationship of rotating speeds of rotary elements of the planetary gear device when the ETC mode of FIG. 4 is established.
Figure 5B:
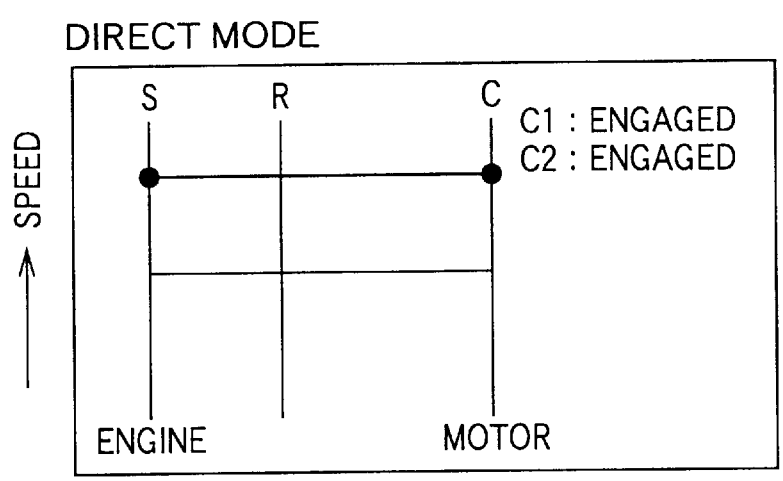
FIG. 5B is a collinear chart indicating a relationship of the rotating speeds of the rotary elements of the planetary gear device when the DIRECT mode of FIG. 4 is established.
Figure 5C:
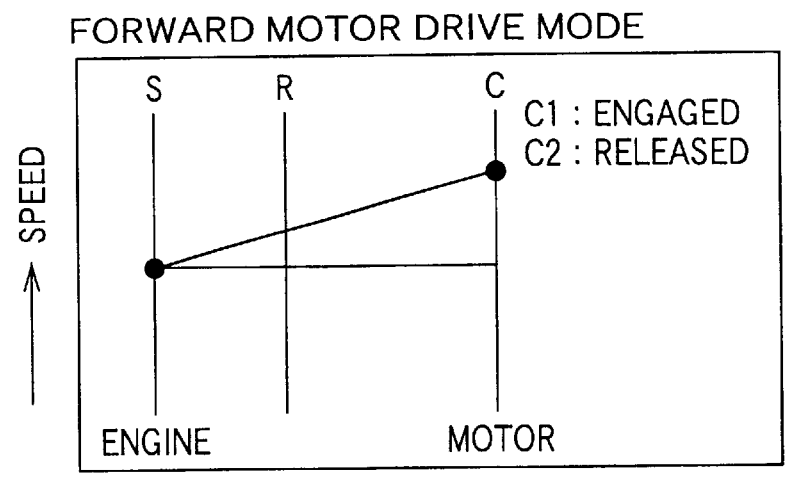
FIG. 5C is a collinear chart indicating a relationship of the rotating speeds of the rotary elements of the planetary gear device when the FORWARD MOTOR DRIVE mode of FIG. 4 is established.

Referring to the collinear charts of FIGS. 5A, 5B and 5C, the rotating speeds of the sun gear 18s, ring gear 18r and carrier 18c of the planetary gear device 18 are taken along vertical axes S, R and C, respectively. The distances between the axes S and R and between the axes R and C are determined by a speed ratio ρ of the planetary gear device 18, which is equal to the number of teeth of the sun gear 18s divided by the number of teeth of the ring gear 18r. Suppose the distance between the axes S and C is equal to "1", the distance between the axes R and C is equal to ρ. In the present embodiment, the speed ratio ρ is about 0.6. In the ETC mode of FIG. 5A, there exists the following relationship among a torque value Te of the engine 14, a torque value Tin of the input shaft 22 of the transmission 12, and a torque value Tm of the motor/generator 16:

$Te:Tin:Tm=\rho:1:1-\rho$.

The required motor torque Tm is smaller than the engine torque Te, and the input shaft torque Tin of the transmission 12 is equal to a sum of the motor torque Tm and the engine torque Te. In the present embodiment, the transmission 12 is a continuously variable transmission (CVT) of a belt-and-pulley type.

Referring back to FIG. 4, a NEUTRAL mode or a CHARGING & ENGINE-STARTING mode is established when the shift lever 30 is placed in the operating position N or P. The NEUTRAL mode is established by releasing all of the first and second clutches C1, C2 and the brake B1. The CHARGING & ENGINE-STARTING mode is established by releasing the first and second clutches C1, C2 and engaging the brake B1. In the CHARGING & ENGINE-STARTING mode, the motor/generator 16 is operated in the reverse direction to start the engine 14, or the engine 14 is operated to drive the motor/generator 16 through the planetary gear device 18 to generate an electric energy for charging a battery 42 (FIG. 1) while the motor/generator 16 is controlled for controlling the amount of electric energy to be generated.

When the shift lever 30 is placed in the operating position R, a REVERSE MOTOR DRIVE mode or a FRICTION DRIVE mode is established. The REVERSE MOTOR DRIVE mode is established by engaging the first clutch C1 and releasing the second clutch C2 and the brake B1. In the REVERSE MOTOR DRIVE mode, the vehicle is driven in the reverse direction by an operation of the motor/generator 16 in the reverse direction so as to rotate the carrier 18c and the input shaft 22 in the reverse direction. The FRICTION DRIVE mode is established when an operation of the engine 14 to assist the motor/generator 16 is required during a running of the vehicle in the REVERSE MOTOR DRIVE mode. The FRICTION DRIVE mode is established by starting the engine 14, engaging the first clutch C1, releasing the second clutch C2, and partially engaging the brake B1 (effecting a slipping engagement of the brake B1) while the sun gear 18s is rotated by the engine 14 in the forward direction so that the ring gear 18r is rotated by the sun gear 18s in the forward direction. With the slipping engagement of the brake B1, the rotation of the ring gear 18r is limited or restricted so that a torque is applied to the carrier 18c in the reverse direction, whereby an assisting drive torque is applied to the input shaft 22 to increase the total drive torque for driving the vehicle in the reverse direction.

Figure 7:
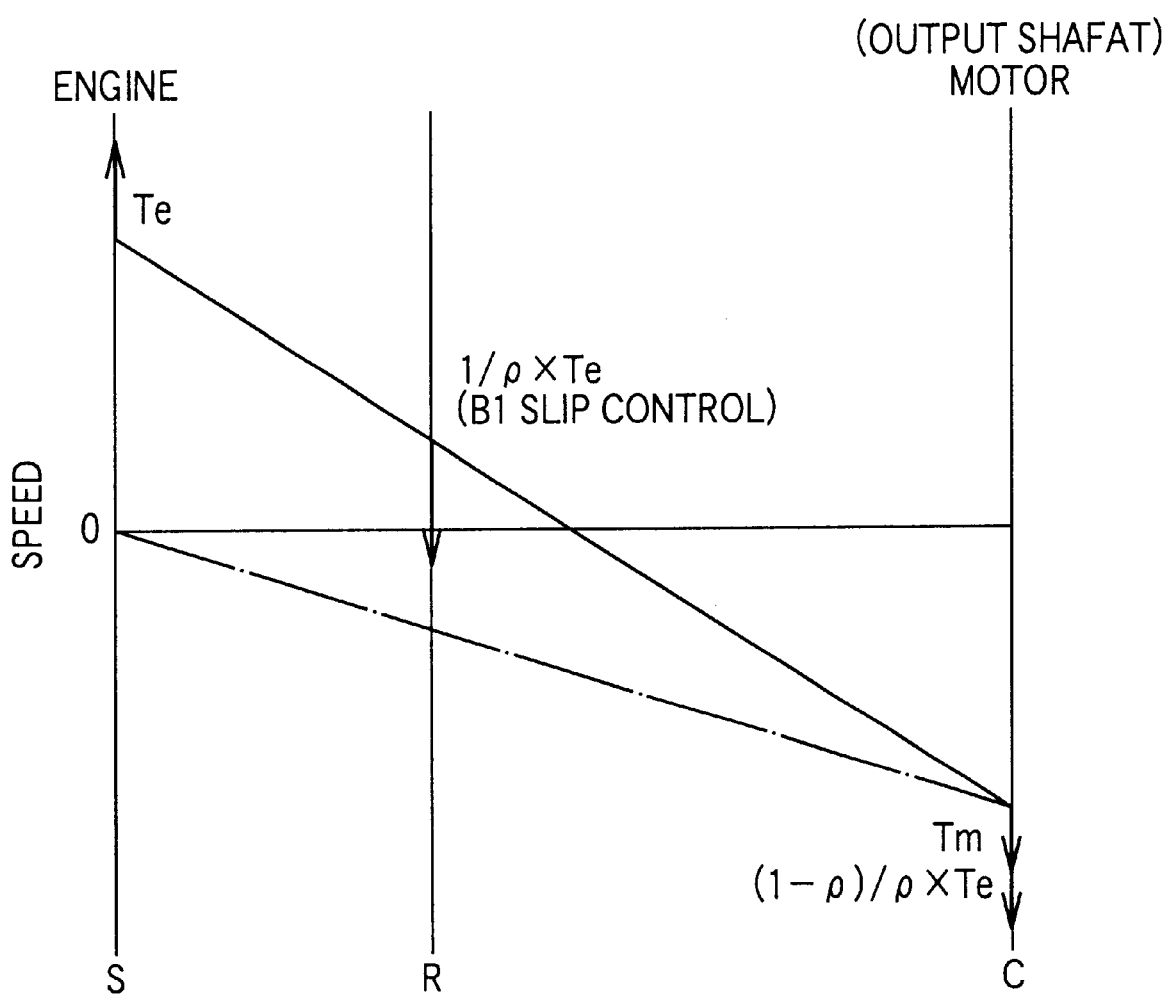
FIG. 7 is a collinear chart indicating a relationship of the rotating speeds of the rotary elements of the planetary gear device when the REVERSE MOTOR DRIVE mode and the FRICTION DRIVE MODE of FIG. 4 are established.

The collinear chart of FIG. 7, which corresponds to the collinear charts of FIGS. 5A, 5B and 5C, shows the operating states of the planetary gear device in the REVERSE MOTOR DRIVE mode and the FRICTION DRIVE mode. Solid line indicates a relationship of the rotating speeds of the sun gear 18s, ring gear 18r and carrier 18c in the REVERSE MOTOR DRIVE mode, while broken line indicates a relationship of the rotating speeds of those rotary elements 18s, 18r, 18c in the FRICTION DRIVE mode. In the REVERSE MOTOR DRIVE mode, the torque Tm as generated by the motor/generator 16 is transmitted to the output shaft 22. In the FRICTION DRIVE mode, the brake B1 is controlled to effect a slipping engagement for transmitting a drive torque Te×(1−ρ) so that a drive torque Te×(1−ρ)/ρ is transmitted to the input shaft 22, when the engine torque is equal to Te. Thus, the input shaft 22 receives a total drive torque of Tm+Te×(1−ρ)/ρ. The drive torque Te×(1−ρ) transmitted through the slipping brake B1, which is referred to as an engaging torque $T_{B1}$ of the brake B1, is controlled by the linear solenoid valve 40 which regulates the hydraulic pressure $P_{B1}$ of the brake B1, more precisely, the pressure $P_{B1}$ applied to the hydraulic actuator of the brake B1.

The transmission 12, which is a continuously variable transmission as described above, has an output shaft 44 which is operatively connected to the right and left drive wheels 52 through a counter gear 45 and a ring gear 50 of a differential gear device 48, such that the drive force is distributed by the differential gear device 48 to the drive wheels 52.

The hybrid drive system 10 is controlled by a hybrid control device 60 shown in FIG. 1. The hybrid control device 60 incorporates a central processing unit (CPU), a random-access memory (RAM) and a read-only memory (ROM). The hybrid control device 60 executes signal processing operations according to control programs stored in the ROM while utilizing a temporary data storage function, to control a throttle control device 62, an engine control device 64, a motor/generator control device 66, a transmission control device 68, the ON-OFF valve 38 and linear solenoid valve 40 of the hydraulic control device 24, and a starter motor 70 for the engine 14. The throttle control device 62 is adapted to control the opening of an electronic throttle valve 72 of the engine 14. The engine control device 64 is adapted to control the output of the engine 14 by controlling the amount of fuel injection into the engine 14, a variable-valve-timing mechanism, and the ignition timing. The motor/generator control device 66 is adapted to control an inverter 74 for controlling the drive torque and regenerative braking torque of the motor/generator 16. The transmission control device 68 is adapted to control a speed ratio γ and the belt tension of the transmission 12. The speed ratio γ is equal to the input shaft speed Nin divided by the output shaft speed Nout. The hydraulic control device 24 is equipped with hydraulic control circuits for controlling the speed ratio γ and belt tension of the transmission 12. The starter motor 70 has a pinion which meshes with a ring gear of a flywheel of the engine 14, for cranking the engine 14 to start the engine 14.

The hybrid control device 60 receives output signals of an accelerator sensor 76, a shift position sensor 80, an engine speed sensor 82, a motor speed sensor 84, an input shaft speed sensor 86 and an output shaft speed sensor 88. The output signal of the accelerator sensor 76 represents an operating amount θ ac of an accelerator operating member in the form of an accelerator pedal 78. The output signal of the shift position sensor 78 represents the presently selected operating position of the shift lever 30. The output signals of the engine speed sensor 82, motor speed sensor 84, input shaft speed sensor 86 and output shaft speed sensor 88 represent the rotating speed Ne of the engine 14, the rotating speed Nm of the motor/generator 16, the rotating speed Nin of the input shaft 22 and the rotating speed Nout of the output shaft 44, respectively. The vehicle running speed V can be obtained from the rotating speed Nout of the output shaft 44. The hybrid control device 60 further receives other signals indicative of the operating condition of the vehicle, such as a signal indicative of the amount of electric energy SOC stored in the battery 42. The electric energy amount SOC may be simply represented by a voltage of the battery 42, or may be obtained on the basis of the detected cumulative charging and discharging amounts of the battery 42. The battery 42 functions as a device for storing an electric energy.

Figure 6:
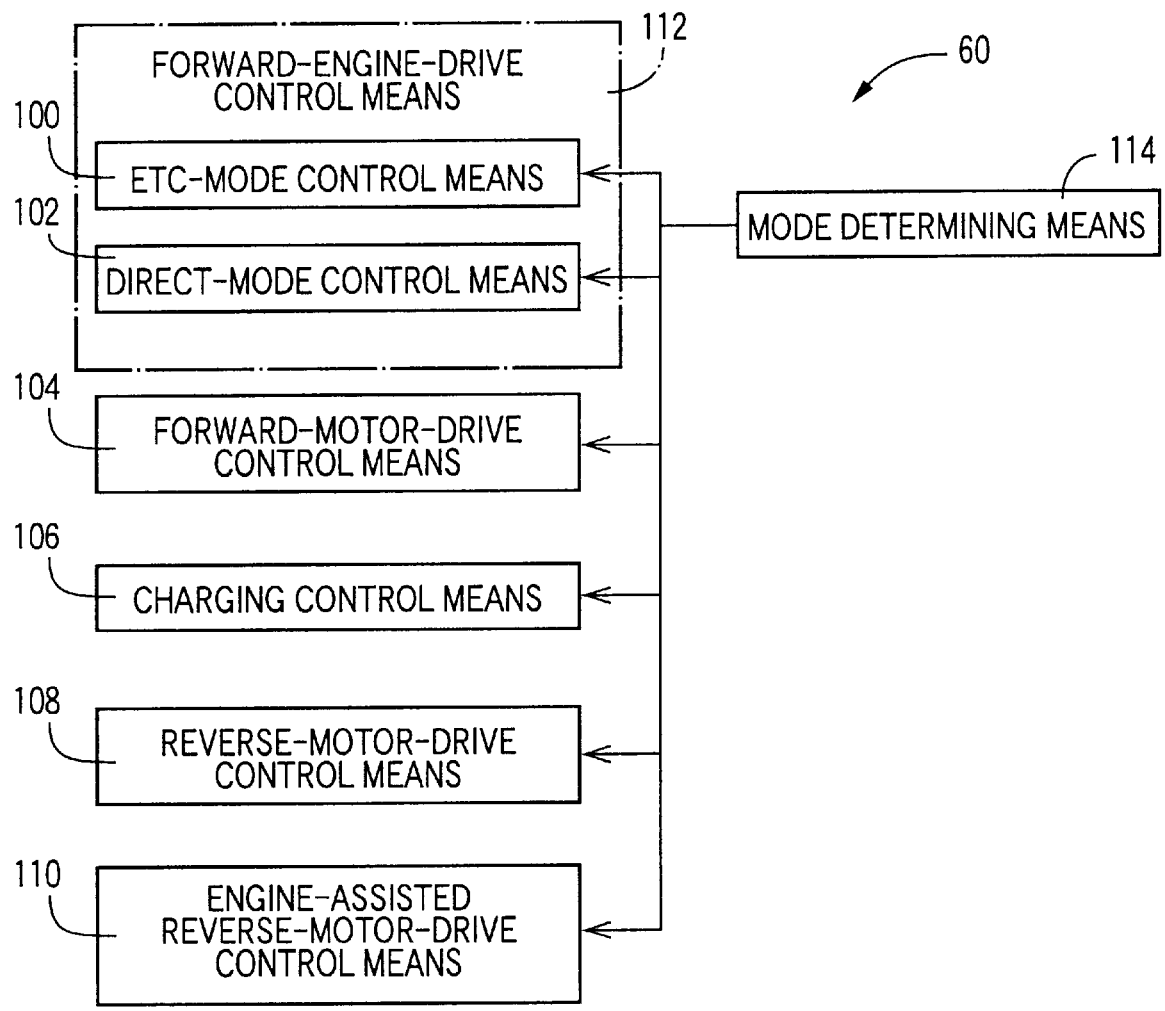
FIG. 6 is a block diagram illustrating various functional means of the hybrid control device.

The hybrid control device 60 has major functional means as illustrated in the block diagram of FIG. 6, which are arranged to selectively establish the operating modes of the vehicle indicated in FIG. 4. Namely, the hybrid control device 60 includes ETC-mode control means 100, DIRECT-MODE control means 102, FORWARD-MOTOR-DRIVE control means 104, CHARGING control means 106, REVERSE-MOTOR-DRIVE control means 108, and ENGINE-ASSISTED REVERSE-MOTOR-DRIVE control means 110. The ETC-mode control means 100 is arranged to establish the ETC mode, and the DIRECT-MODE control means 102 is arranged to establish the DIRECT mode. The FORWARD-MOTOR-DRIVE control means 104 is arranged to establish the FORWARD MOTOR DRIVE mode, and the CHARGING control means 106 is arranged to establish the CHARGING & ENGINE-STARTING mode. The REVERSE-MOTOR-DRIVE control means 108 is arranged to establish the REVERSE MOTOR DRIVE mode, and the ENGINE-ASSISTED REVERSE-MOTOR-DRIVE control means 110 is arranged to establish the FRICTION DRIVE mode. The ETC-MODE control means 100 and the DIRECT-MODE control means 102 cooperate to constitute FORWARD-ENGINE-DRIVE control means 112. The hybrid control device 60 further includes mode determining means 114 selects one of the above-indicated operating modes that should be established, on the basis of the operating amount θ ac of the accelerator pedal 78, the vehicle running speed V (speed Nout of the output shaft 44), the stored electric energy amount SOC, the presently selected operating position of the shift lever 30, and other parameters of the vehicle. The mode determining means 114 activates one of the above-indicated means 100, 102, 104, 106, 108 and 110, which corresponds to the selected operating mode. It will be understood that the engine-assisted reverse-motor-drive control means 110 serves as reverse friction-drive control means, while the brake B1 serves as a brake for fixing the third rotary element of the planetary gear device 18 to its housing.

Referring to the flow chart of FIG. 8, there will be described a control routine for controlling the hybrid drive system 10 when the vehicle is driven in the REVERSE MOTOR DRIVE mode or the FRICTION DRIVE mode, with the shift lever 30 placed in the operating position R. This control routine is executed by the hybrid control device 60 with a predetermined cycle time. The time chart of FIG. 16 shows changes in various parameters during a transient control effected when the vehicle operating mode is changed from the REVERSE MOTOR DRIVE MODE to the FRICTION DRIVE mode according to the control routine of FIG. 8, immediately after starting of the vehicle. It will be understood that the FRICTION DRIVE mode is an example of an engine-assisted reverse motor drive mode for the engine 14 to provide an assisting rear drive torque while the vehicle is driven in the REVERSE MOTOR DRIVE mode.

The control routine of FIG. 8 is initiated with step S1 to determine whether a vehicle drive torque Tdrv desired by the vehicle operator is larger than a predetermined threshold value. If an affirmative decision (YES) is obtained in step S1, the control flow goes to step S5 and subsequent steps for establishing the FRICTION DRIVE mode or effecting the transient control for transition from the REVERSE MOTOR DRIVE mode to the FRICTION DRIVE mode. If a negative decision (NO) is obtained in step S1, the control flow goes to step S2 and subsequent steps for establishing the REVERSE MOTOR DRIVE mode or effecting the transient control for transition from the FRICTION DRIVE mode to the REVERSE MOTOR DRIVE mode. The determination in step S1 is made by the mode determining means 114, using the permissible maximum torque Tmax of the motor/generator 16 as the predetermined threshold value of the operator's desired drive torque Tdrv. The permissible maximum torque Tmax is determined depending upon the stored electric energy amount SOC, such that the permissible maximum torque Tmax decreases with a decrease in the stored electric energy amount SOC, as indicated in the graph of FIG. 17, so that the FRICTION DRIVE is selected more frequently when the stored electric energy amount SOC is relatively small. The operator's desired drive torque Tdrv is obtained on the basis of the operating amount θ ac of the accelerator pedal 78, the vehicle speed V and the speed ratio γ of the transmission 12.

To establish the REVERSE MOTOR DRIVE mode when the operator's desired drive torque Tdrv is not larger than the threshold, step S2 is initially implemented to determine whether a flag F0 is set at "1". If the flag F0 is set at "0", the control flow goes to step S4 to establish the REVERSE MOTOR DRIVE mode. When the flag F0 is set at "1", the control flow goes to step S3 in which the transient control is effected for transition from the FRICTION DRIVE mode to the REVERSE MOTOR DRIVE mode, more specifically, so as to release the brake B1 and turn off the engine 14 while restricting a variation in the vehicle drive force. Steps S3 and S4 are followed by step S25 in which a case flag is set to "0". In the control routine of FIG. 8, the case flag is variable from "0" to "5", as described below. One of sub-routines illustrated in the flow charts of FIGS. 9–15 is executed depending upon the value of the case flag. The vehicle running in the REVERSE MOTOR DRIVE mode is initiated at a point of time to indicated in the time chart of FIG. 16, with the accelerator pedal 78 being depressed.

To establish the FRICTION DRIVE mode when the operator's desired drive torque Tdrv is larger than the predetermined threshold, step S5 is initially implemented to set the flag F0 to "1". Then, the control flow goes to step S6 to determine whether the case flag is set at "0". In the first control cycle after the operating mode has changed from the REVERSE MOTOR DRIVE mode to the FRICTION DRIVE mode, the case flag is set at "0", so that the control flow goes from step S6 to step S7 to set the case flag to "1", and to step S8 in which a case-i sub-routine is implemented as illustrated in the flow chart of FIG. 9. The case-1 sub-routine is initiated at a point of time $t_1$ indicated in FIG. 16, as a result of implementation of steps S5–S8 where an affirmative decision (YES) is obtained in step S1 with the operator's desired drive torque Tdrv exceeding the predetermined threshold (i.e., permissible maximum torque Tmax of the motor/generator 16).

Figure 9:
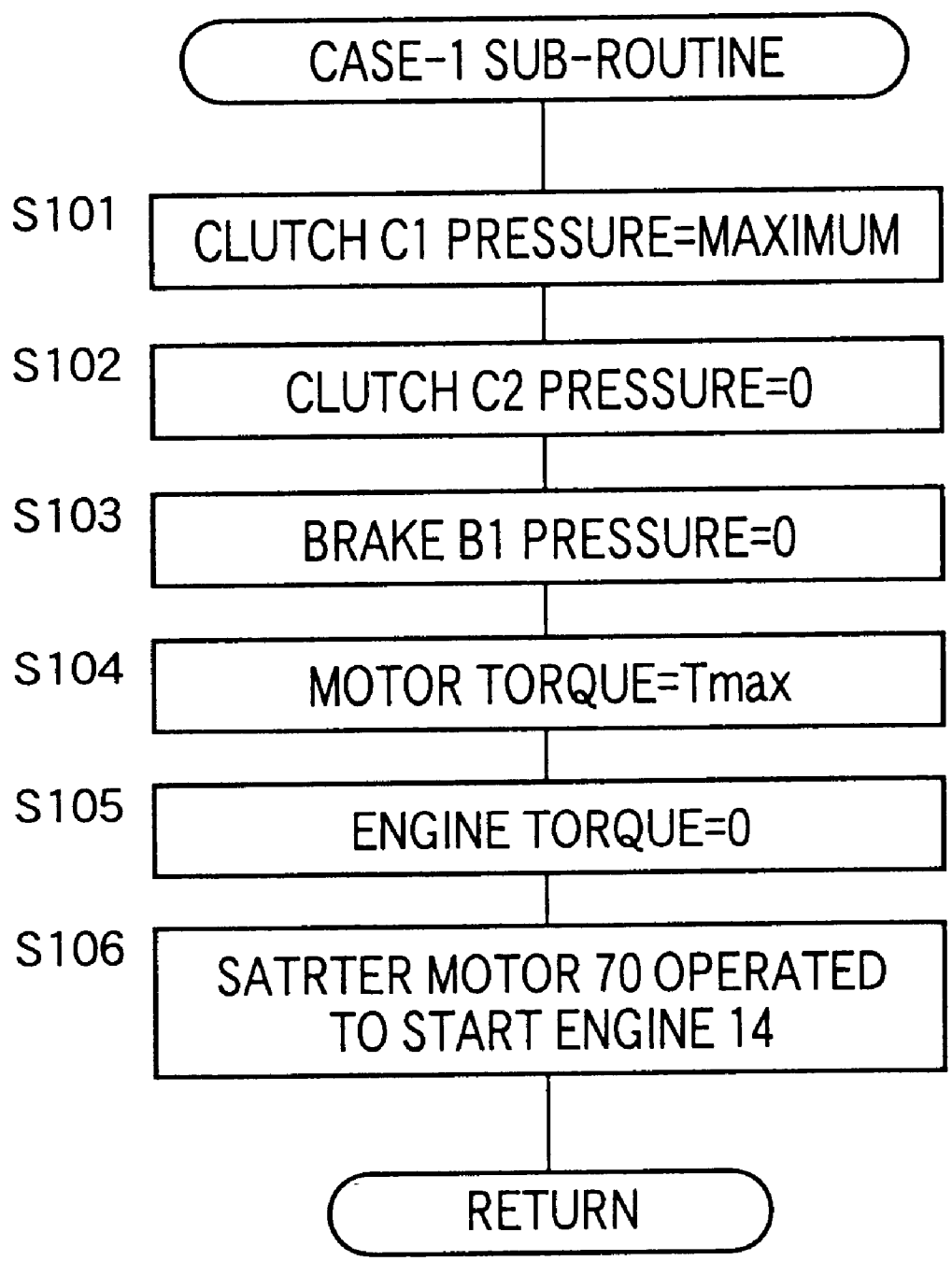
FIG. 9 is a flow chart showing details of a case-1 sub-routine implemented in step S8 of the control routine of FIG. 8.

The case-i sub-routine of FIG. 9 is initiated with step S101 in which the ON-OFF valve 38 is controlled to regulate the hydraulic pressure $P_{C1}$ of the first clutch C1 to the maximum value, for achieving a full engagement of the first clutch C1. Step S101 is followed by step S102 in which the hydraulic pressure $P_{C2}$ of the second clutch C2 is zeroed to fully release the second clutch C2. In the present hybrid drive system 10, the line pressure PC is not applied to the second clutch C2 while the shift lever 30 is placed in the operating position R, so that the hydraulic pressure PC2 is zeroed without any substantial control of the linear solenoid valve 40. Then, step S103 is implemented to zero the hydraulic pressure $P_{B1}$ of the brake B1 to release the brake B1, by regulating the linear solenoid valve 40. Step S103 is followed by step S104 in which the torque Tm of the motor/generator 16 is made equal to the predetermined threshold used in step S1, that is, made equal to the permissible maximum torque Tmax. Step S105 is then implemented to control the electronic throttle 72 for zeroing the torque Te of the engine 14, that is, for establishing an idling state of the engine 14. Step S105 is followed by step S106 in which the starter motor 70 is activated to crank and start the engine 14.

Referring back to the flow chart of FIG. 8, a negative decision (NO) is obtained in step S6 when the control routine is executed for the second time after the affirmative decision is obtained for the first time in step S1. According, step S9 is implemented to determine whether the case flag is set at "1". When an affirmative decision (YES) is obtained in step S9, the control flow goes to step S10 to determine whether the engine 14 is operating by itself with perfect combustion of the air-fuel mixture. This determination may be made by determining whether the rotating speed Ne of the engine 14 is higher than a predetermined lower limit, for instance, 650 r.p.m. The case-1 sub-routine (step S8) is repeatedly executed until an affirmative decision (YES) is obtained in step S10. When the affirmative decision is obtained in step S10, the control flow goes to step S11 to set the case flag to "2", and to step S12 in which a case-2 sub-routine is executed as illustrated in the flow chart of FIG. 10. The case-2 sub-routine is initiated at a point of time $t_2$ indicated in FIG. 16, with the affirmative decision obtained in step S10, namely, with the engine speed Ne exceeding the lower limit (e.g., 650 r.p.m.).

Figure 10:
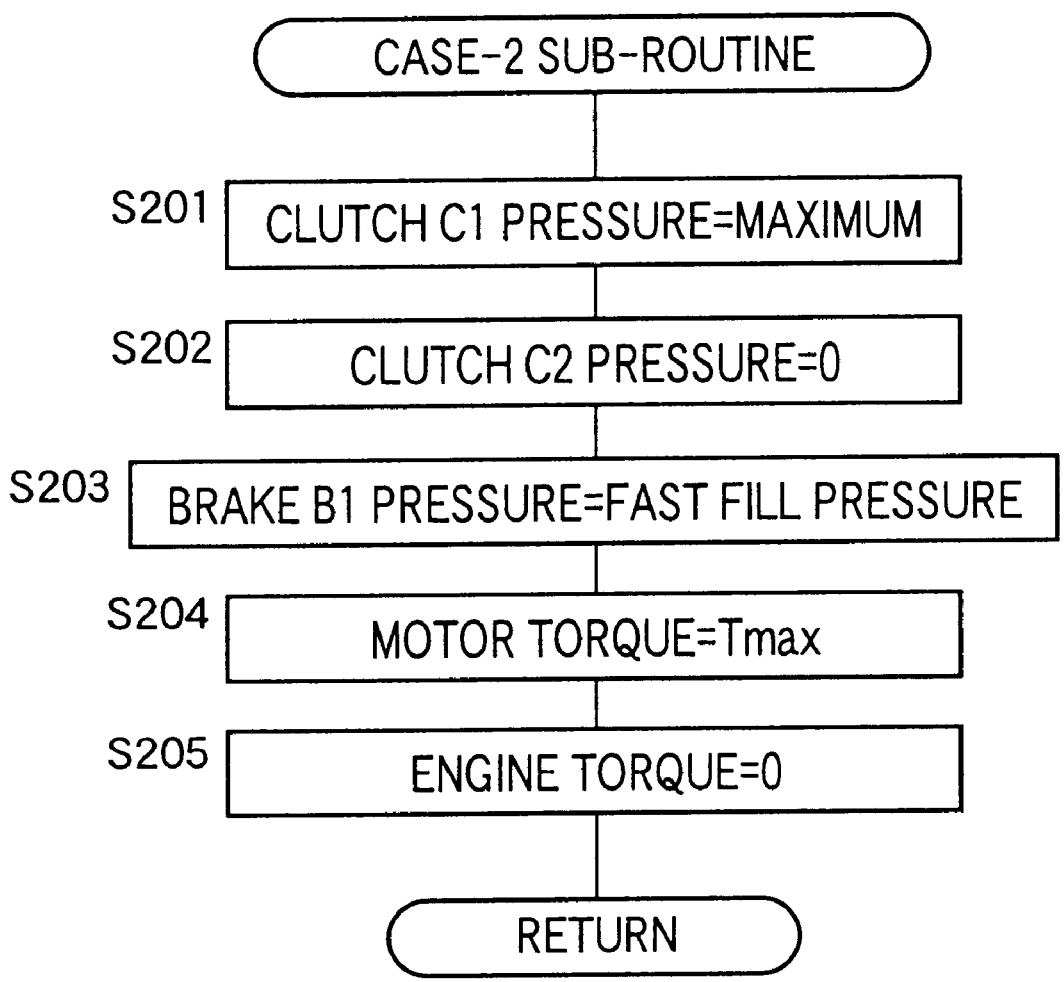
FIG. 10 is a flow chart showing details of a case-2 sub-routine implemented in step S12 of the control routine of FIG. 8.

Steps S201 and S202 in the case-2 sub-routine of FIG. 10 are identical with steps S101 and S102. Step S202 is followed by step S203 in which the hydraulic actuator for the brake B2 is supplied with the pressurized fluid for fast filling, that is, the control valve 36 is fully opened by the linear solenoid valve 40, to maximize the rate of flow of the pressurized fluid to the hydraulic actuator of the brake B1, for rapidly moving the piston of the hydraulic actuator to a position near its engaging stroke end. Steps S204 and S205 following step S203 are identical with steps S104 and S105 of the case-1 sub-routine of FIG. 9.

Figure 11:
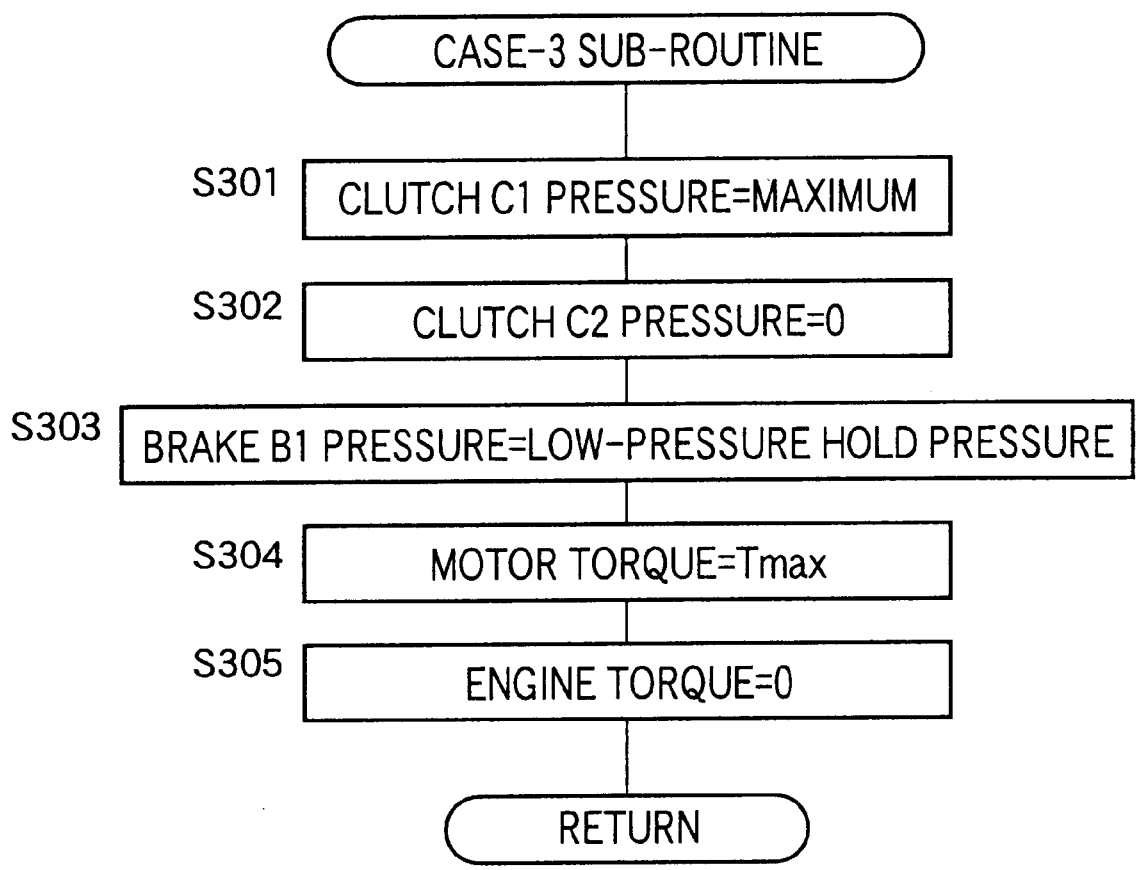
FIG. 11 is a flow chart showing details of a case-3 sub-routine implemented in step S16 of the control routine of FIG. 8.

Referring back to the control routine of FIG. 8, when a negative decision (NO) is obtained in step S9 in the next cycle of execution, the control flow goes to step S13 to determine whether the case flag is set at "2". If an affirmative decision (YES) is obtained in step S13, the control flow goes to step S14 to determine whether the fast filling of the hydraulic actuator for the brake B1 has been completed. This determination in step S14 is effected by determining whether a predetermined time has passed after step S203 of the case-2 sub-routine is initially implemented. The case-2 sub-routine of FIG. 10 (step S12 of the control routine of FIG. 8) is repeatedly executed until the fast filling has been completed. When an affirmative decision (YES) is obtained in step S14, the control flow goes to step S15 to set the case flag to "3", and then goes to step S16 in which a case-3 sub-routine of FIG. 11 is executed. The case-3 sub-routine is initiated at a point of time t3 indicated in the time chart of FIG. 16, upon completion of the fast filling of the hydraulic actuator of the brake B1.

Steps S301 and S302 of the case-3 sub-routine of FIG. 11 are identical with steps S101 and S102 of the case-1 sub-routine of FIG. 9. Step S302 is followed by step S303 in which the hydraulic pressure $P_{B1}$ of the brake B1 is held at a predetermined low level which is slightly lower than the pressure at which the brake B1 begins to transmit a drive torque. This predetermined low level of the pressure $P_{B1}$ is determined by a control signal applied to the linear solenoid valve 40, which control signal is preferably adjusted or updated from time to time by learning compensation. Steps S304 and S305 are identical with steps S104 and S105 of the case-1 sub-routine.

Figure 12:
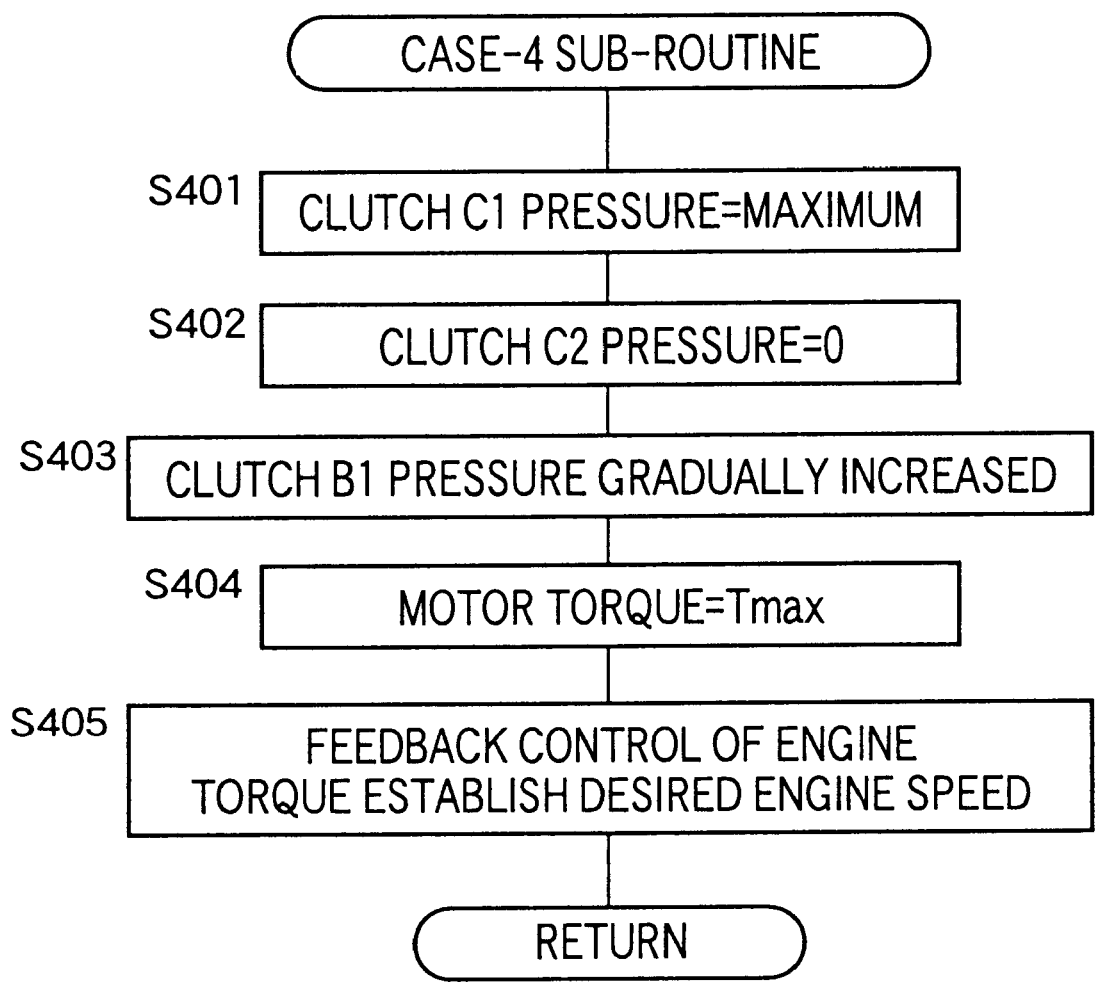
FIG. 12 is a flow chart showing details of a case-4 sub-routine implemented in step S20 of the control routine of FIG. 8.

Referring back again to the control routine of FIG. 8, when a negative decision (NO) is obtained is obtained in step S13 in the next cycle of execution of the control routine, the control flow goes to step S17 to determine whether the case flag is set at "3". If an affirmative decision (YES) is obtained in step S17, the control flow goes to step S18 to determine whether the hydraulic pressure $P_{B1}$ has been held at the predetermined low level for a predetermined length of time. The case-3 sub-routine of FIG. 11 (step S16 of FIG. 8) is repeatedly executed until an affirmative decision (YES) is obtained in step S18. When the affirmative decision is obtained in step S18, the control flow goes to step S19 to set the case flag to "4" and to step S20 in which a case-4 sub-routine of FIG. 12 is executed. The case-4 sub-routine is initiated at a point of time $t_4$ indicated in FIG. 16, with the affirmative decision obtained in step S18.

Steps S401 and S402 of the case-4 sub-routine of FIG. 12 are identical with steps S101 and S102 of FIG. 9. Step S402 is followed by step S403 to gradually increase or sweep up the hydraulic pressure $P_{B1}$ of the brake B2 at a suitable rate. The rate of increase of this hydraulic pressure $P_{B1}$ may be a predetermined constant, or may be a variable which changes with a suitable parameter such as the operating amount θ ac of the accelerator pedal 78 or the operator's desired drive torque Tdrv. As the hydraulic pressure $P_{B1}$ is gradually increased, the brake B1 is brought into a slipping engagement so as to initiate the transmission of a drive torque, so that a drive torque $T_{B1} \times (1-\rho)$ corresponding to the engaging torque $T_{B1}$ of the brake B1 acts on the carrier 18c of the planetary gear device 18. At this point of time, the ring gear 18r is rotated in the forward direction with a rotary motion of the engine 14, and the carrier 18c receives the drive torque in the reverse direction for driving the vehicle in the reverse direction. Step S403 is followed by step S404 identical with step S104 in the case-1 sub-routine of FIG. 9. Step S404 is followed by step S405 in which the torque Te of the engine 14 is controlled in a feedback fashion so that the speed Ne of the engine 14 coincides with a desired value Ne*. The desired engine speed value Ne* is determined according to a predetermined maximum fuel economy curve so that the engine 14 is operated with a maximum fuel economy. Further, a portion of the engaging torque $T_{B1}$ of the brake B1 determined by the hydraulic pressure $P_{B1}$, which portion corresponds to the engine 14, namely, the torque $T_{B1} \times \rho$ corresponding to the gear ratio ρ of the planetary gear device 18 is controlled as a feed-forward item. The engaging torque $T_{B1}$ is obtained from the hydraulic pressure $P_{B1}$, the friction coefficient, friction surface area and radius of the friction members of the brake B1, and the above-indicated predetermined low level at which the hydraulic pressure PB1 is held in step S303.

Referring back again to the control routine of FIG. 8, when a negative decision (NO) is obtained in step S17 in the next control cycle, the control flow goes to step S21 to determine whether the case flag is set at "4". When an affirmative decision (YES) is obtained in step S21, the control flow goes to step S22 to determine whether the gradual increase of the hydraulic pressure $P_{B1}$ has been completed. This determination in step S22 is made by determining whether the engaging torque $T_{B1}$ of the brake B1 has satisfied the following equation (1) which includes the operator's desired drive torque Tdrv and the motor torque Tm:

$$T_{B1} = (Tdrv - Tm)/(1-\rho) \quad (1)$$

Figure 13:
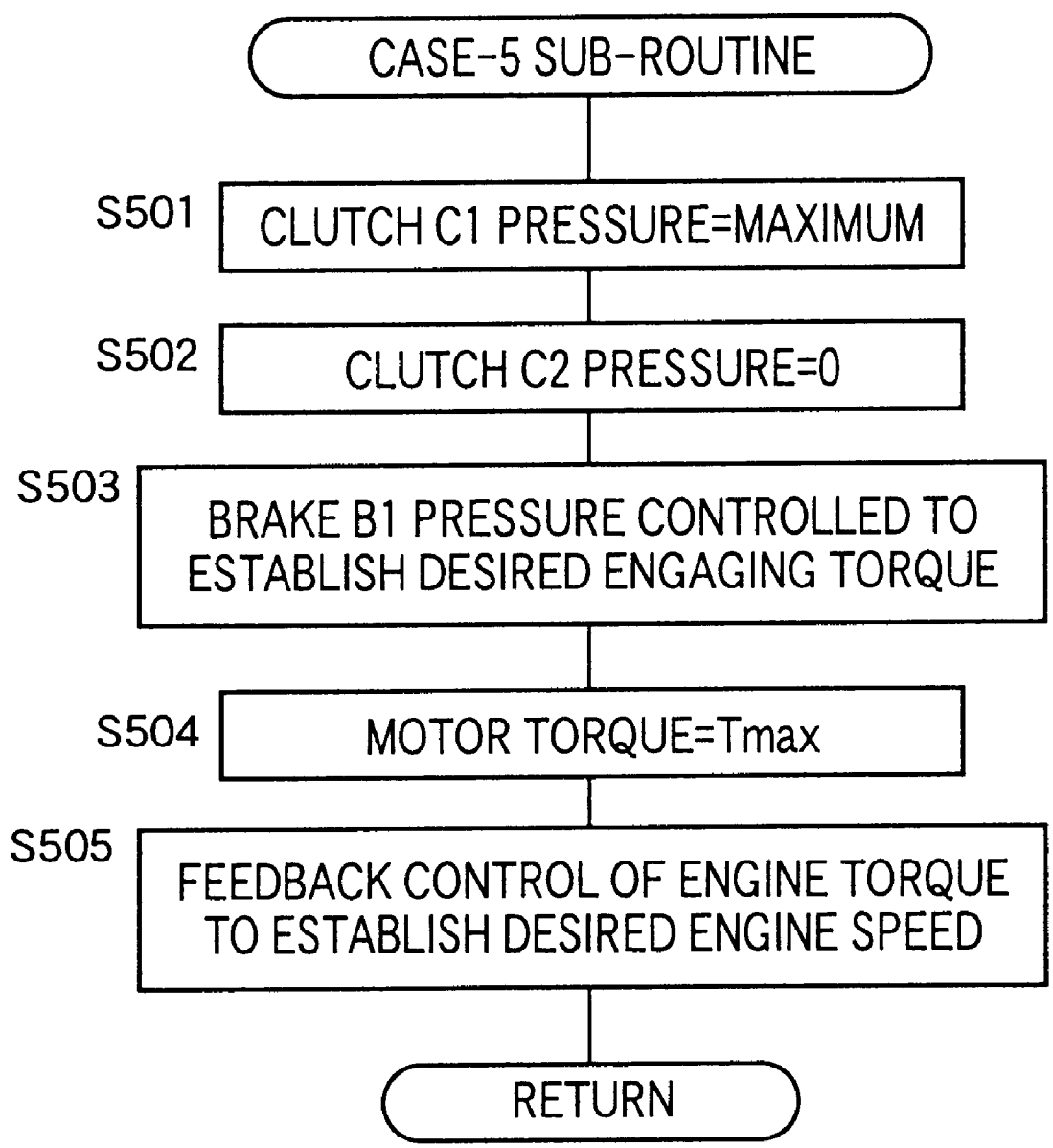
FIG. 13 is a flow chart showing details of a case-5 sub-routine implemented in step S24 of the control routine of FIG. 8.

The above equation (1) is formulated to determine whether a shortage (Tdrv−Tm) of the vehicle drive torque which is a difference of the motor torque Tm (=Tmax) from the desired drive torque Tdrv is transmitted from the engine 14 to the output shaft 22 through the slipping brake B1 and the carrier 18c, that is, whether the desired drive torque Tdrv is transmitted to the output shaft 22. If an affirmative decision (YES) is obtained in step S22, it means that the transient control for transition from the REVERSE MOTOR DRIVE mode to the FRICTION DRIVE mode has been terminated. In this case, the control flow goes to step S23 to set the case flag to "5", and then to step S24 in which a case-5 sub-routine of FIG. 13 is executed. If a negative decision (NO) is obtained in step S21, that is, if the case flag is set at "5", the control flow goes to step S24 while skipping steps S22 and S23. The case-5 sub-routine of FIG. 13 is initiated at a point of time $t_6$ indicated in FIG. 16, upon completion of the gradual increase of the hydraulic pressure $P_{B1}$.

The case-5 sub-routine of FIG. 12 is executed by the engine-assisted reverse-motor-drive control means 110 to drive the engine in the FRICTION DRIVE mode. This sub-routine is initiated with steps S501 and S502 which are identical with steps S101 and S102 of the case-1 sub-routine of FIG. 9. Step S502 is followed by step S503 in which the hydraulic pressure $P_{B1}$ of the brake B1 is controlled so as to provide the engaging torque $T_{B1}$ which satisfies the above equation (1). Then, the control flow goes to step S504 identical with step S104 of the case-1 sub-routine, in which the motor torque Tm is controlled to be the permissible maximum value Tmax. Step S504 is followed by step S505 in which the torque Te of the engine 14 is controlled in the feedback fashion so that the engine speed Ne coincides with the desired value Ne*, and so that a component of the engaging torque $T_{B1}$ of the brake B1 determined by the hydraulic pressure $P_{B1}$, which component to the torque Te of the engine 14, namely, the torque $T_{B1} \times \rho$ corresponding to the gear ratio ρ of the planetary gear device 18 is controlled as a feed-forward item, as in step S405.

As described above, the present hybrid drive system 10 is arranged such that the vehicle is driven in the reverse direction in the REVERSE MOTOR DRIVE mode by an operation of the motor/generator 16 in the reverse direction while the first clutch C1 is held in the engaged state and the second clutch C2 and the brake B1 are held in the released state. The hybrid drive system 10 is further arranged such that the operating mode of the vehicle is changed from the REVERSE MOTOR DRIVE mode to the FRICTION DRIVE mode when the operator's desired drive torque Tdrv exceeds the permissible maximum torque Tmax of the motor/generator 16. In the FRICTION DRIVE mode, the engine 14 is operated, and the brake B1 is controlled to effect a slipping or partial engagement for enabling the engine 14 to produce an assisting drive torque, so that the vehicle is driven by both the motor/generator 16 and the engine 14, more precisely with the drive torque $Tm + Te \times (1-\rho)/\rho$.

The present embodiment wherein the brake B1 is partially engaged or has a slipping engagement in the FRICTION DRIVE mode is effective to not only reduce an abrupt variation in the vehicle drive force upon starting of the engine 14 to produce an assisting rear drive torque during a vehicle running with the motor/generator 16, and but also permit the engine 14 to be operated at a relatively high speed Ne even at a relatively low running speed of the vehicle.

Further, the present embodiment is adapted such that the permissible maximum torque Tmax of the motor/generator 16 decreases with a decrease in the electric energy amount SOC stored in the battery 42, so that the FRICTION DRIVE mode is likely to be established when the electric energy amount SOC is relatively small, assuring effective utilization of the electric energy. When the stored electric energy amount SOC is relatively large, the permissible maximum torque Tmax of the motor/generator 16 is made relatively large, so that the vehicle is driven by the motor/generator 16 in the REVERSE MOTOR DRIVE mode, even when the operator's desired drive torque Tdrv is relatively large. Accordingly, the efficiency of consumption of the electric energy by the motor/generator 16 is improved. When the stored electric energy amount SOC is relatively small, on the other hand, the permissible maximum torque Tmax is made relatively small, so that the operation of the motor/generator 16 is restricted, and the engine 14 is operated to produce an assisting drive torque. Thus, the required vehicle drive torque can be obtained while minimizing the amount of consumption of the electric energy, so that the electric energy amount SOC stored in the battery 42 can be maintained in a range in which the energy consumption efficiency is relatively high.

In the vehicle running in the FRICTION DRIVE mode controlled according to the case-5 sub-routine, the engaging torque TB1 of the brake B1 is controlled so as to operate the engine 14 to compensate for the shortage (Tdrv−Tm) of the vehicle drive torque, which is the operator's desired drive torque Tdrv minus the torque Tm of the motor/generator 16. This torque value (Tdrv−Tm) may be referred to as a differential torque. In addition, the torque Te of the engine 14 is controlled in a feedback fashion so that the engine speed Ne coincides with the desired value Ne*. Thus, the operator's desired drive torque Tdrv can be produced by both of the engine 14 and the motor/generator 16, with the engine speed Ne being controlled to the desired value Ne* with high accuracy.

Figure 14:
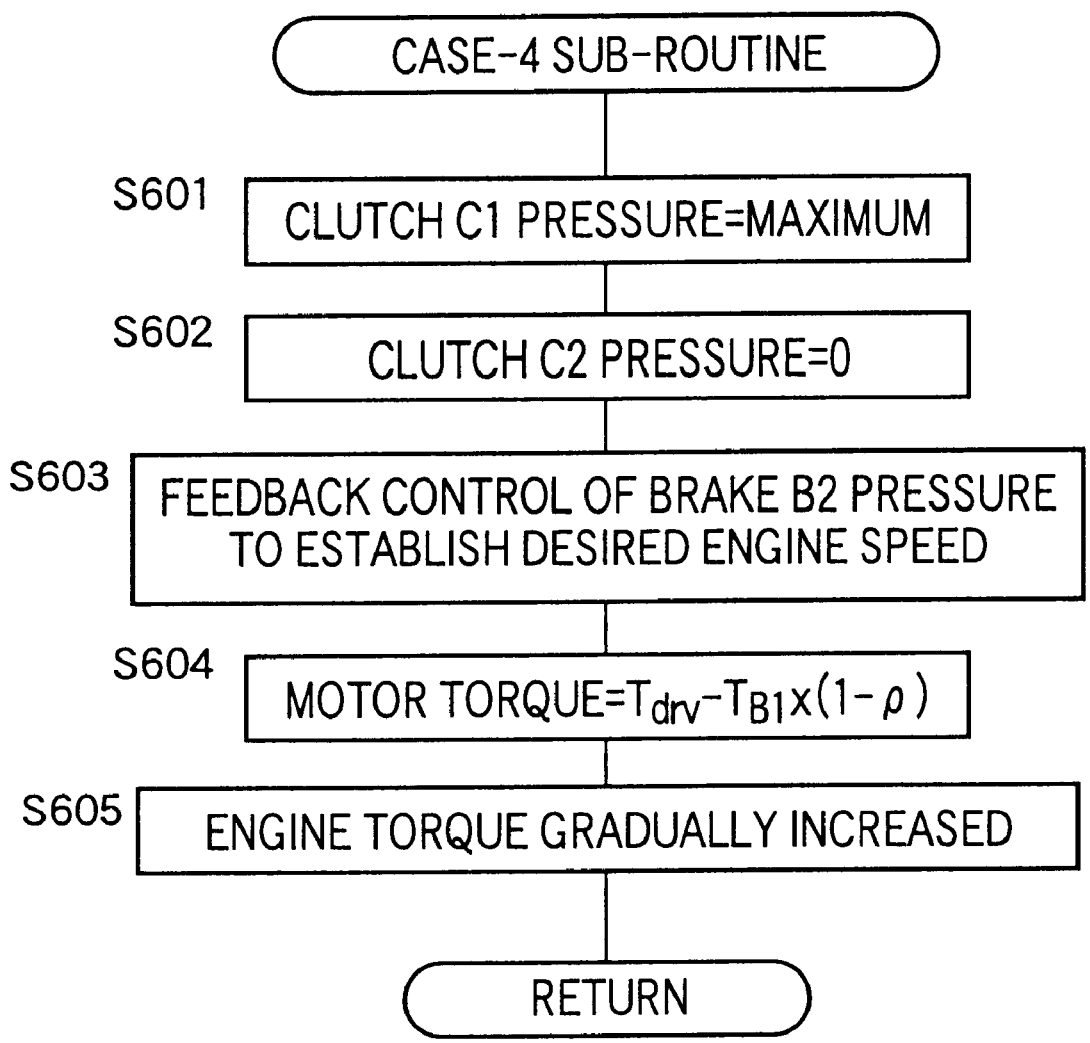
FIG. 14 is a flow chart showing details of a case-4 sub-routine which is implemented in place of the case-4 sub-routine of FIG. 12, according to another embodiment of this invention.

Referring next to the flow charts of FIGS. 14 and 15 corresponding to those of FIGS. 12 and 13, there will be described another embodiment of this invention. In the embodiment of FIG. 14, the case-4 sub-routine is initiated with steps S601 and S602 identical with steps S401 and S402 of FIG. 12. Step S602 is followed by step S603 in which the hydraulic pressure $P_{B1}$ of the brake B1 is feedback-controlled such that the engine speed Ne coincides with the desired value Ne*. In the feedback control, it is desirable that a component of the engine torque Te which is assigned to the brake B1, namely, the component Te/ρ be controlled as a feed-forward item. Then, the control flow goes to step S604 in which the motor torque Tm is controlled to be Tdrv−$TB_{B1}$×(1−ρ). Then, step S605 is implemented to gradually increase or sweep up the engine torque Te until the differential torque (Tdrv−Tm) acts on the carrier 18c with a slipping engagement of the brake B1. The rate of gradual increase of this engine torque Te may be a predetermined constant, or a variable which is adjusted or changed on the basis of the operating amount ac of the accelerator pedal 78 and the operator's desired drive torque Tdrv. The engine torque Te at which the differential torque (Tdrv−Tm) acts on the carrier 18c is represented by the following equation (2):

$$Te=(Tdrv-Tm)\times\rho/(1-\rho) \quad (2)$$

When the engine torque Te satisfied the above equation (2), the sweep-up or gradual increase of the engine torque Te is terminated. Consequently, the affirmative decision (YES) is obtained in step S22 of the control routine of FIG. 8, and the transient control for transition from the REVERSE MOTOR DRIVE mode to the FRICTION DRIVE mode is terminated. In step S24, a case-5 sub-routine illustrated in the flow chart of FIG. 14 is executed to establish the FRICTION DRIVE mode. Steps S701, S702, S703, S704 in the sub-routine of FIG. 15 are identical with steps S601, S602, S603 and S604 of FIG. 14, respectively. Step S704 is followed by step S705 in which the engine torque Te is controlled to be the value calculated according to the above equation (2).

Figure 15:
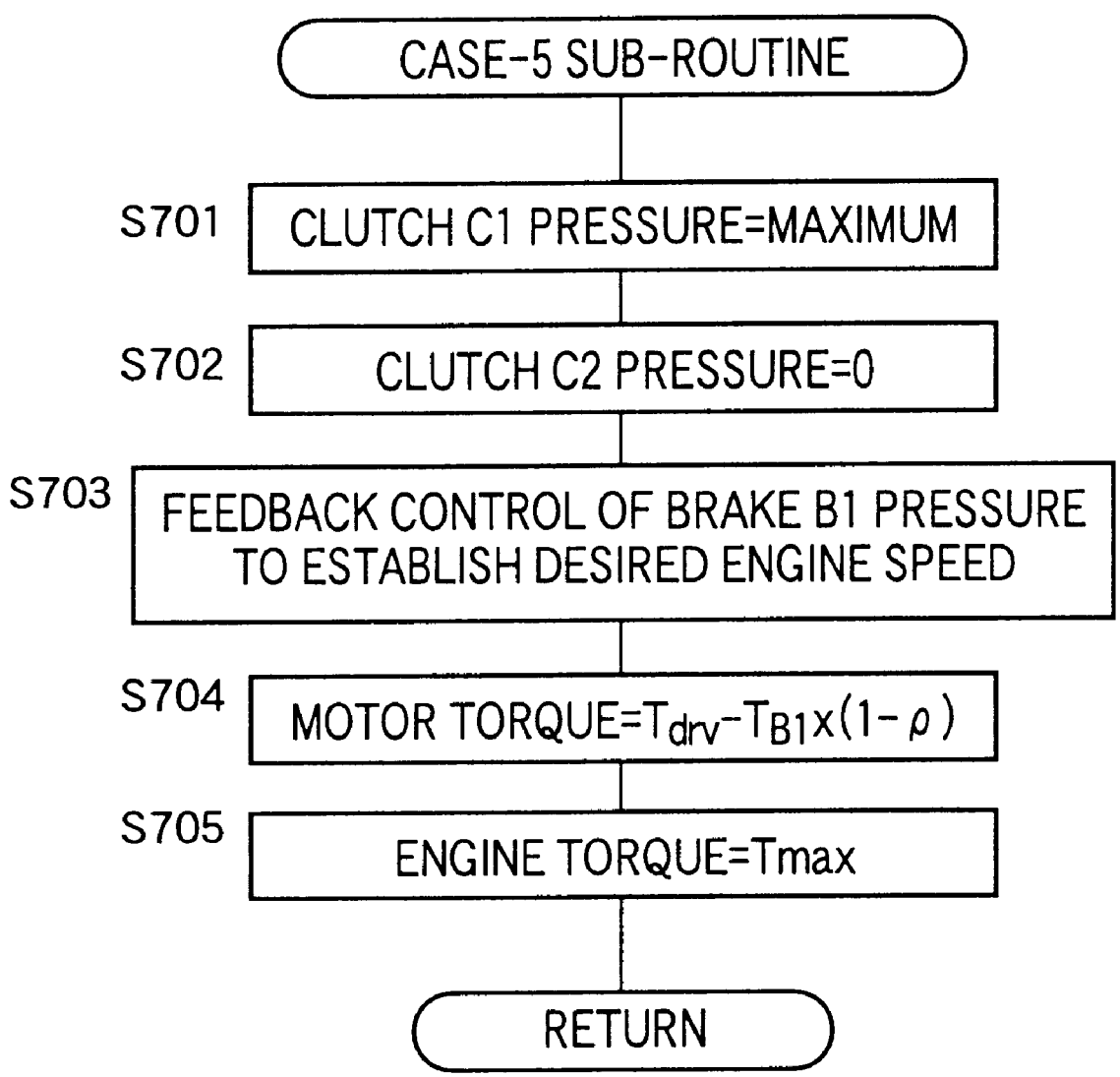
FIG. 15 is a flow chart showing details of a case-5 sub-routine which is implemented in place of the case-5 sub-routine of FIG. 13, according to the embodiment of FIG. 14.

The second embodiment of FIGS. 14 and 15 has substantially the same advantages as the first embodiment.

While the presently preferred embodiments of this invention have been described above in detail by reference to the accompanying drawings, for illustrative purpose only, it is to be understood that the present invention may be embodied with various changes, modifications and improvements, which may occur to those skilled in the art, without departing from the spirit and scope of the invention defined in the following claims:

What is claimed is:

1. A vehicle rear driving apparatus for driving an automotive vehicle in a reverse direction, the automotive vehicle having a drive power source, an output member operatively connected to a drive wheel of the vehicle for driving the vehicle, a synthesizing/distributing device of gear type including a housing, a first rotary element, a second rotary element and a third rotary element, said first and second rotary elements being rotated in respective opposite directions when said third rotary element is stationary, and connected to said drive power source and said output member, respectively, and a brake for fixing said third rotary element to said housing, wherein an improvement comprises:

said brake being a frictional coupling device capable of effecting a slipping engagement; and reverse friction-drive control means operable when said first rotary element is rotated in a forward direction with an operation of said drive power source, while said third rotary element is rotated in the forward direction with a rotary motion of said first rotary element, said reverse friction-drive control means controlling said brake to effect said slipping engagement so as to restrict a rotary motion of said third rotary element, for thereby causing a drive torque to act on said second rotary element in a reverse direction to drive the vehicle in the reverse direction.

2. A vehicle rear driving apparatus according to claim 1, wherein said automotive vehicle is a hybrid vehicle wherein said drive power source includes an engine operable by combustion of a fuel, and an electric motor, and said synthesizing/distributing device comprises a planetary gear device including a sun gear as said first rotary element, a carrier as said second rotary element, and a ring gear as said third rotary element, said engine being connected to said sun gear while said electric motor being connected to said carrier, and wherein said brake is operable to fix said ring gear to said housing, said apparatus further comprising;
a first clutch is provided for connecting said carrier to said output member; and
a second clutch is provided for connecting said ring gear to said output member.

3. A vehicle rear driving apparatus for driving an automotive vehicle in a reverse direction, the automotive vehicle having a drive power source consisting of an engine operable by combustion of a fuel and an electric motor, an output member operatively connected to a drive wheel of the vehicle for driving the vehicle, a synthesizing/distributing device of gear type including a housing, a first rotary element, a second rotary element and a third rotary element, said first and second rotary elements being rotated in respective opposite directions when said third rotary element is stationary, and connected to said engine and said electric motor, respectively, and a brake for fixing said third rotary element to said housing, wherein an improvement comprises:

said brake being a frictional coupling device capable of effecting a slipping engagement;

reverse-motor-drive control means for operating said electric motor in a reverse direction to rotate said second rotary element with said brake held in a released state thereof, for thereby driving the vehicle in the reverse direction; and engine-assisted reverse-motor-drive control means operable when the vehicle is driven in the reverse direction under the control of said reverse-motor-drive control means, said reverse-motor-drive control means operating said engine to rotate said first rotary element in a forward direction, and controlling said brake to effect said slipping engagement while said third rotary element is rotated in a forward direction with a rotary motion of said first rotary element in said forward direction, so that a rotary motion of said third rotary element is restricted to cause a drive torque to act on said second rotary element in a reverse direction to drive the vehicle in the reverse direction.

4. A vehicle rear driving apparatus according to claim 3, wherein said automotive vehicle is a hybrid vehicle wherein said drive power source includes an engine operable by combustion of a fuel, and an electric motor, and said synthesizing/distributing device comprises a planetary gear device including a sun gear as said first rotary element, a carrier as said second rotary element, and a ring gear as said third rotary element, said engine being connected to said sun gear while said electric motor being connected to said carrier, and wherein said brake is operable to fix said ring gear to said housing, said apparatus further comprising;

a first clutch is provided for connecting said carrier to said output member; and a second clutch is provided for connecting said ring gear to said output member.

5. A vehicle rear driving apparatus according to claim 3, further comprising mode determining means for selecting an operating mode of the vehicle such that an engine-assisted reverse motor drive mode in which the vehicle is driven in the reverse direction by said electric motor and said engine under the control of said engine-assisted reverse-motor-drive control means is selected more frequently when an amount of electric energy stored in an electric energy storing device to operate said electric motor is relatively small than when said amount of electric energy stored in said electric energy storing device is relatively large.

6. A vehicle rear driving apparatus according to claim 3, wherein said engine-assisted reverse-motor-drive control means includes means for controlling an engaging torque of said brake according to a difference between a desired vehicle drive torque desired by an operator of the vehicle and an output torque of said electric motor, and controls an output torque of said engine in a feedback fashion such that an operating speed of said engine coincides with a desired value.

* * * * *